United States Patent
Yatsuyanagi et al.

(10) Patent No.: US 6,177,505 B1
(45) Date of Patent: *Jan. 23, 2001

(54) POLYSILOXANE-CONTAINING RUBBER COMPOSITION

(75) Inventors: Fumito Yatsuyanagi; Kazunori Ishikawa; Yoshiaki Hashimura; Tetsuji Kawazura; Hiroyuki Kaido, all of Hiratsuka (JP)

(73) Assignee: The Yokohama Rubber Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/708,060

(22) Filed: Aug. 30, 1996

(30) Foreign Application Priority Data

| Aug. 31, 1995 | (JP) | 7-223079 |
| Oct. 20, 1995 | (JP) | 7-272859 |
| Dec. 27, 1995 | (JP) | 7-341540 |
| Jan. 19, 1996 | (JP) | 8-007643 |
| Jan. 19, 1996 | (JP) | 8-007663 |
| May 10, 1996 | (JP) | 8-116763 |
| Jul. 30, 1996 | (JP) | 8-200596 |

(51) Int. Cl.[7] .................................................. C08K 3/00
(52) U.S. Cl. ........................ 524/506; 525/105; 525/106; 523/213
(58) Field of Search .................. 524/506; 523/213; 525/105, 106

(56) References Cited

U.S. PATENT DOCUMENTS

| 3,255,140 | * | 6/1966 | Sinn et al. .......................... 524/506 |
| 4,201,698 | * | 5/1980 | Itoh et al. ........................... 260/3 |
| 4,369,289 | * | 1/1983 | Keogh ................................ 525/105 |
| 4,474,908 | * | 10/1984 | Wagner ............................... 523/213 |
| 4,518,376 | * | 5/1985 | Mashimo et al. .................... 474/261 |
| 4,526,922 | * | 7/1985 | Pickwell et al. .................... 524/445 |
| 4,714,733 | * | 12/1987 | Itoh et al. ........................... 524/493 |
| 4,753,976 | | 6/1988 | Yoshioka et al. .................... 524/575.5 |
| 5,009,874 | | 4/1991 | Parmentier et al. ................. 423/335 |
| 5,094,829 | | 3/1992 | Krivak et al. ........................ 423/339 |
| 5,171,787 | * | 12/1992 | Zama et al. .......................... 525/105 |
| 5,248,751 | | 9/1993 | Takahashi et al. ................... 528/15 |
| 5,401,482 | | 3/1995 | Frederic et al. ..................... 423/331 |
| 5,412,015 | * | 5/1995 | Sommer et al. ..................... 524/425 |
| 5,430,087 | * | 7/1995 | Carlson et al. ...................... 524/496 |
| 5,496,527 | | 3/1996 | Yokogawa et al. .................. 423/338 |

FOREIGN PATENT DOCUMENTS

| 29 33 247 | | 3/1980 | (DE) . |
| 0 816 424 | | 1/1998 | (EP) . |
| 56-76440 | * | 11/1979 | (JP) . |
| 55-31817 | | 3/1980 | (JP) . |
| 56-76440 | | 6/1981 | (JP) . |
| 57-172925 | | 10/1982 | (JP) . |
| 62-487435 | | 3/1987 | (JP) . |
| 6-248116 | | 9/1994 | (JP) . |
| 8-53630 | | 2/1996 | (JP) . |
| 8048910 | | 2/1996 | (JP) . |
| 8-157601 | | 6/1996 | (JP) . |
| 09111044 | | 4/1997 | (JP) . |

OTHER PUBLICATIONS

Gomu Kogyo Binran (Rubber Industry Handbook), 1995, pp. 517–518.
Tire Technology International, 1995, pp. 107–108.

* cited by examiner

*Primary Examiner*—Margaret G. Moore
(74) *Attorney, Agent, or Firm*—Finnegan, Henderson, Farabow, Garrett & Dunner, L.L.P.

(57) ABSTRACT

A rubber composition having improved properties containing a starting rubber (e.g., diene rubber) and a polysiloxane having the following alkoxysilyl group (I) and/or acyloxysilyl group (II) and having an average degree of polymerization of 3 to 10,000:

$$\equiv Si\text{—}OR^1 \quad \quad (I)$$

$$\equiv Si\text{—}OCOR^2 \quad \quad (II)$$

wherein, $R^1$ is a substituted or unsubstituted monovalent hydrocarbon group having 1 to 18 carbon atoms or an organic group containing an ether bond and $R^2$ is hydrogen or a hydrocarbon group having 1 to 21 carbon atoms.

17 Claims, No Drawings

POLYSILOXANE-CONTAINING RUBBER COMPOSITION

BACKGROUND OF THE INVENTION

1. Field of the Invention

The present invention relates to a polysiloxane-containing rubber composition having improved properties and a rubber compounding agent therefor.

2. Description of the Related Art

Rubber compositions comprising various rubbers and a filler such as silica are known in the art and are used, for example, as rubber compositions for tire treads having a low heat generation characteristic and superior in abrasion resistance etc. However, tire treads in which silica is formulated have a low rolling resistance and a good grip on wet roads, but there were the problems that the viscosity of the unvulcanized compound increases, the vulcanization is slowed, the kneading performance in the mixing falls, etc. and the productivity deteriorates. Various proposals have been made in the past to solve these problems, but unfortunately these are not practically satisfactory.

For example, it has been proposed to add diethylene glycol or a fatty acid (for example, see Gomu Kogyo Binran (or Rubber Industry Handbook), fourth version, pp. 517 to 518, published 1994), to add a metal salt of a carboxylic acid (for example, see Tire Technology International 1995, pp. 107 to 108), and to treat the silica in advance with silicone oil (for example, see Japanese Unexamined Patent Publication (Kokai) No. 6-248116). Further, the only way to deal with scorching during mixing and a fall in the kneading performance is to increase the number of times of mixture. Further, even when mixing carbon and silica, the practice is to either mix them separately or to increase the mixing time or frequency of mixture. None of these are unfortunately practically acceptable.

On the other hand, various metal oxides are used in many fields such as rubber, cosmetics, synthetic resins, coating compositions, adhesives, magnetic tapes. In most cases, since the metal oxides are added to organic materials, problems arise how the metal oxides are dispersed in the organic materials. For this purpose; various attempts have been made to solve these problems. For example, the treatment of the metal oxides with surface treatment agents has been proposed. JP-A-8-48910 discloses a method for treating a metal oxide with methyl hydrogen polysiloxane, in which the metal oxides are necessary for treating at a high temperature. JP-A-8-53630 discloses the treatment with an alkoxy silane, but this is not still sufficient.

On the other hand, rubber compositions comprising various rubbers and metal oxides such as silica, clay, talc are known and are used as, for example, rubber compositions for tire tread having excellent low heat build-up and abrasion resistance. However, when metal oxides are compounded, there are disadvantages, when compared in the case of carbon black, the modulus is decreased and the abrasion resistance is low. To solve these problems, the above-mentioned JP-A-6-248116 has been proposed. (i.e., silica is surface-treated under heating with, for example, a hydrophobic agent such as silicone oil comprising an organic silicon compound at, for example, 250° C. for 1 hour. However, this method has a disadvantage of a short scorching due to heating at a high temperature.

SUMMARY OF THE INVENTION

Accordingly, the objects of the present invention are to eliminate the above-mentioned disadvantageous of the prior art and to provide a filler-containing vulcanizing rubber composition which improves the processability of the unvulcanized rubber composition, without substantially impairing the properties of the filler-containing vulcanized rubber composition such as the low heat generation characteristic and the abrasion resistance.

Another object of the present invention is to provide a rubber compounding agent improving the vulcanized physical properties of a silica-containing vulcanizing rubber composition, in particular the modulus, abrasion resistance, and tanδ balance etc. and a silica-containing vulcanizing rubber composition using the same.

A further object of the present invention is to provide a surface-treated metal oxide capable of increasing the reinforceability when compounding into rubber and of improving the modulus and the abrasion resistance of the rubber composition and a rubber composition containing the same.

A still further object of the present invention is to provide a silica-containing vulcanizing rubber composition for a tire tread which improves the processability of the unvulcanized rubber composition, without substantially impairing the properties of the silica-containing vulcanizing rubber composition, for example, the low heat generation characteristic and the abrasion resistance.

Other objects and advantages of the present invention will be apparent from the following description.

In accordance with the present invention, there is provided a rubber composition comprising a filler, said rubber composition containing a polysiloxane having the following alkoxysilyl group (I) and/or acyloxysilyl group (II) and having at least six alkoxy groups or at least two acyloxy groups directly bonded to the Si atom in the molecule thereof and having an average degree of polymerization of 3 to 10,000:

$$\equiv Si-OR^1 \qquad (I)$$

$$\equiv Si-OCOR^2 \qquad (II)$$

wherein, $R^1$ is a substituted or unsubstituted monovalent hydrocarbon group having 1 to 18 carbon atoms or an organic group containing an ether bond and $R^2$ is hydrogen or a hydrocarbon group having 1 to 21 carbon atoms.

In accordance with the present invention, there is provided a rubber compounding agent comprising (A) a polysiloxane having the following alkoxysilyl group (I) and/or acyloxysilyl group (II) and having an average degree of polymerization of 3 to 10,000 and (B) a silane coupling agent in a ratio of (A)/(B)=95/5 to 5/95:

$$\equiv Si-OR^1 \qquad (I)$$

$$\equiv Si-OCOR^2 \qquad (II)$$

wherein, $R^1$ is a substituted or unsubstituted monovalent hydrocarbon group having 1 to 18 carbon atoms or an organic group containing an ether bond and $R^2$ is hydrogen or a hydrocarbon group having 1 to 21 carbon atoms.

In accordance with the present invention, there is further provided a rubber composition comprising 100 parts by weight of a starting rubber, 5 to 100 parts by weight of silica, and an amount of the above-mentioned rubber compounding agent to give a content of the polysiloxane contained therein of 0.2 to 30% by weight in the total composition.

In accordance with the present invention, there is further provided a polysiloxane surface-treated metal oxide comprising 100 parts by weight of a metal oxide surface treated with 0.1–50 parts by weight of a polysiloxane having the following alkoxysilyl group (I) and/or acyloxysilyl group (II) and having an average degree of polymerization of 3 to 10,000:

$$\equiv Si-OR^1 \quad (I)$$

$$\equiv Si-OCOR^2 \quad (II)$$

wherein, $R^1$ is a substituted or unsubstituted monovalent hydrocarbon group having 1 to 18 carbon atoms or an organic group containing an ether bond and $R^2$ is hydrogen or a hydrocarbon group having 1 to 21 carbon atoms.

In accordance with the present invention, there is further provided a rubber composition comprising 100 parts by weight of a starting rubber and 5 to 100 parts by weight of the above-mentioned polysiloxane surface-treated metal oxide.

In accordance with the present invention, there is provided a rubber composition for a pneumatic tire tread comprising 100 parts by weight of a diene rubber, 2 to 80 parts by weight of carbon black, 5 to 80 parts by weight of silica, a silane coupling agent, and a polysiloxane having the following alkoxysilyl group (I) and/or acyloxysilyl group (II) and having an average degree of polymerization of 3 to 10,000:

$$\equiv Si-OR^1 \quad (I)$$

$$\equiv Si-OCOR^2 \quad (II)$$

wherein $R^1$ and $R^2$ are the same as defined above.

DESCRIPTION OF THE PREFERRED EMBODIMENTS

The term "filler" used herein means any conventional inorganic fillers (e.g., calcium carbonate, clay, talc, diatomaceous silica, mica, alumina, aluminum sulfate, barium sulfate, calcium sulfate, etc.) and so-called reinforcing agents, (e.g., carbon black, silica, etc.). The term "silica" used herein means wet silica and dry silica and silica having a nitrogen specific surface area of 50 to 400 m²/g. The use of the wet silica is preferable. Further, the term "vulcanization" used herein includes cross-linking by sulfur, peroxide, etc. in addition to the usual vulcanization by sulfur.

The first aspect of the present invention provides a rubber composition comprising a filler, said rubber composition containing a polysiloxane having the following alkoxysilyl group (I) and/or acyloxysilyl group (II) and having an average degree of polymerization of 3 to 10,000, preferably 10 to 1,000:

$$\equiv Si-OR^1 \quad (I)$$

$$\equiv Si-OCOR^2 \quad (II)$$

wherein, $R^1$ is a substituted or unsubstituted monovalent hydrocarbon group having 1 to 18 carbon atoms, preferably an alkyl group having 1 to 6 carbon atoms and an aryl group having 6 to 12 carbon atoms, or an organic group containing an ether bond, preferably $R^6(OR^7)_n$ (wherein $R^6$ is $C_1-C_6$ alkyl, $R^7$ is $C_2-C_4$ alkylene, n is 1 to 3, $R^2$ is hydrogen or a hydrocarbon group having 1 to 21 carbon atoms, preferably $C_1-C_{21}$ alkyl or $C_6-C_{12}$ aryl which may be substituted with $C_1-C_6$ alkyl. More preferably, the polysiloxane has at least six alkoxy groups and/or at least two acyloxy groups directly bonded to the Si atom in the molecule thereof.

According to a preferable embodiment of the present invention, there is provided a rubber composition further containing in the rubber composition a silane coupling agent in an amount of 40% by weight or less of the silica content.

As explained above, there was the problem that the vulcanized properties of the tire tread containing silica were excellent, but the processability at the time when unvulcanized was poor. We have found that, this is due to the silanol groups (Si—OH) present on the surface of the silica. The cohesiveness of the silanol groups causes the production of structures in the rubber composition and the increase in the viscosity, the polarity of the silanol groups causes the vulcanization accelerator etc. to be adsorbed and vulcanization to be delayed, and the compatibility with the nonpolarized rubber is insufficient, and therefore, the kneading performance in the mixing is decreased. Due to these phenomena, the processability of the unvulcanized composition falls. Further, in many cases silane coupling agents can be jointly used in a silica-containing rubber composition to reinforce the rubber, but silanol groups are also present inside the silica particles and there was the problem that these would react with the silane coupling agent to cause a loss of the silane coupling agent and reduce the reinforcing effect, making inclusion of a large amount of a silane coupling agent necessary. When diethylene glycol or other polarized substance is added to this, it is possible to prevent to a certain extent the phenomenon of adsorption of the vulcanization accelerator or other polarized compounding agents, but complete prevention is not possible and it was not possible to prevent the substances chemically bonding with a silane coupling agent or other silica particles from bonding inside.

According to the present invention, since a polysiloxane having the alkoxysilyl groups and/or acyloxysilyl groups of the above formulae (I) and/or (II), respectively, is blended into the rubber composition, the alkoxysilyl groups (I) and/or acyloxysilyl groups (II) react with the silanol groups and covers the surface of the silica particles, and therefore, the problems in the prior art are solved and it is possible to effectively suppress the rise in viscosity caused by the cohesiveness and polarity of the silanol groups and the wasted consumption of the vulcanization accelerator or other polarized additives or silane coupling agent etc.

The polysiloxane containing the alkoxysilyl groups (I) and/or acyloxysilyl groups (II) blended in the rubber composition according to the present invention, as mentioned above, must have an alkoxysilyl group (I) and/or acyloxysilyl group (II) reacting with a silanol group and be a polymer (or oligomer) of a size covering the surface of the silica particles and exhibit a lubricating effect, for example, an average degree of polymerization of 3 to 10,000, preferably 10 to 1,000 (or a number average molecular weight of 200 to 300,000, preferably 500 to 50,000). Accordingly, in the polysiloxane of the present invention, it is essential that a $\equiv Si-O-R^3$ group and/or $\equiv Si-OCOR^2$ group be present. These groups may be at the main chain, side chains, or ends. In addition, the presence of at least six alkoxy groups and/or at least two acyloxy groups preferably directly bonded to the Si atom in one molecule thereof provides the strong bonding with the filler. Further, a hydrogen group or other organic groups are also possible. The polysiloxane usable in the first aspect of the present invention preferably has at least one hydrocarbon group such as alkyl group directly bonded to the Si atom in the molecule thereof in view of the affinity thereof with the rubber component.

The polysiloxane is a known substance. For example, it may be manufactured as follows:

The polysiloxane containing an alkoxysilyl or acyloxysilyl group is synthesized by causing a reaction between an Si—H group containing polysiloxane and alcohol or carboxylic acid in the presence of a catalyst.

As the ≡Si—H group containing polysiloxane, the ones illustrated below may be mentioned:

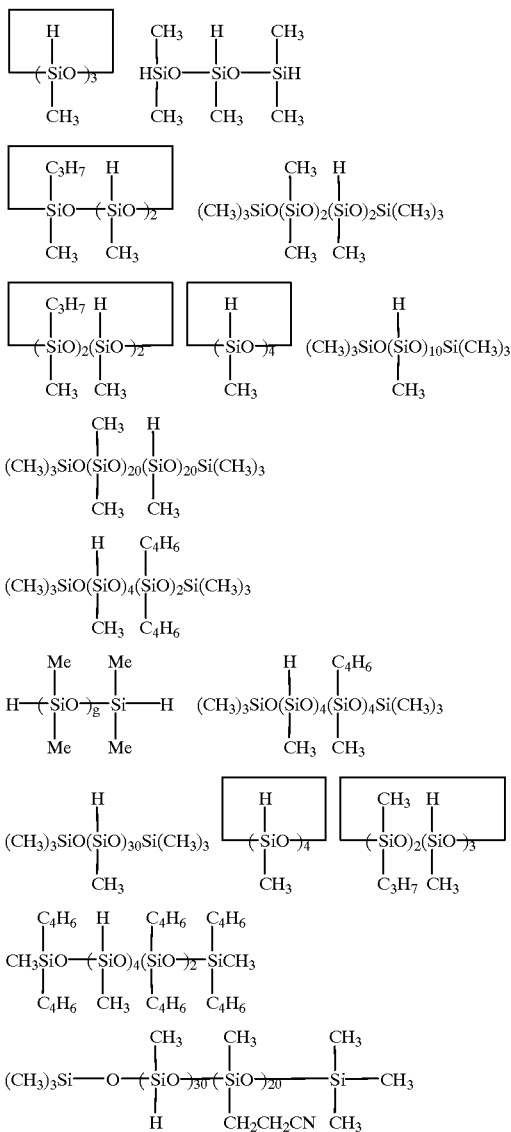

As the alcohol usable in the present invention, methanol, ethanol, propanol, butanol, pentanol, heptanol, octanol, octadecanol, phenol, benzyl alcohol, and also ethylene glycol monomethyl ether, diethylene glycol monomethyl ether, and other alcohols having oxygen atoms may be illustrated.

As the carboxylic acid, acetic acid, propionic acid, palmitic acid, stearic acid, myristic acid, etc. may be mentioned.

As the catalyst, chloroplatinic acid, platinum-ether complexes, platinum-olefin complexes, $PdCl_2$ $(PPh_3)_2$, $RhCl_2$ $(PPh_3)_2$, or basic catalysts may be used. The corresponding ≡Si—H group containing polysiloxane and alcohol or carboxylic acid are reacted in the presence of the catalyst for synthesis.

As the method for introducing the organic group, introduction is easy by causing a reaction of ≡Si—H and an organic compound having a double bond. As a compound having a double bond, there are styrene, α-methylstyrene, α-methylstyrene dimer, limonene, vinylcyclohexene, etc.

As another method, synthesis is possible by causing a reaction between a corresponding ≡Si—H group containing polysiloxane and a double bond containing alkoxysilane as shown below in the presence of the above catalyst:

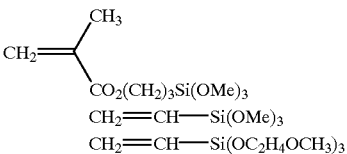

As still another method, the polysiloxane used in the present invention may be synthesized by causing a reaction between a silanol terminal polysiloxane and an alkoxysilane in the presence of a bivalent tin compound or other catalyst. Examples of such a silanol terminal polysiloxane are:

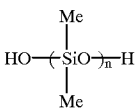

wherein n is 1 to 2000

Examples of the alkoxysilane, are the following alkoxysilanes. Further, the silane coupling agents shown in Table I are exemplified.

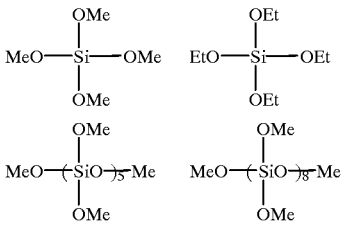

TABLE I

| Chemical name | Structural formula |
|---|---|
| Vinyltrimethoxysilane | $CH_2$=$CHSi(OCH_3)_3$ |
| Vinyltriethoxysilane | $CH_2$=$CHSi(OCH_2CH_3)_3$ |
| Vinyltris(2-methoxyethoxy)silane | $CH_2$=$CHSi(OCH_2CH_2OCH_3)_3$ |
| N-(2-aminoethyl)3-aminopropylmethyl-dimethoxysilane | $H_2NCH_2CH_2NH(CH_2)_3Si(OCH_3)_2$<br>$\|$<br>$CH_3$ |
| N-(2-aminoethyl)3-aminopropyltrimethoxy-silane | $H_2NCH_2CH_2NH(CH_2)_3Si(OCH_3)_3$ |
| 3-aminopropyltrimethoxy-silane | $H_2N(CH_2)_3Si(OCH_3)_3$ |
| 3-glycidoxypropyltri-methoxysilane | $CH_2$—$CHCH_2O(CH_2)_3Si(OCH_3)_3$<br>   \O/ |
| 3-glycidoxypropylmethyl-dimethoxysilane | $CH_2$—$CHCH_2O(CH_2)_3Si(OCH_3)_2$<br>   \O/   $CH_3$ |
| 2-(3,4-epoxycyclohexyl)ethyl-trimethoxysilane | (epoxycyclohexyl)—$CH_2CH_2Si(OCH_3)_3$ |

TABLE I-continued

| Chemical name | Structural formula |
| --- | --- |
| 3-methacryloxypropyl-trimethoxysilane | CH$_2$=CCO$_2$(CH$_2$)$_3$Si(OCH$_3$)$_3$<br>\|<br>CH$_3$ |
| 3-mercaptopropyl-trimethoxylsilane | HS(CH$_2$)$_3$Si(OCH$_3$)$_3$ |
| 3-aminopropyl-triethoxysilane | H$_2$N(CH$_2$)$_3$Si(OCH$_2$CH$_3$)$_3$ |
| bis-[3-(triethoxysilyl)-propyl]tetrasulfide | [(CH$_3$CH$_2$O)$_3$Si(CH$_2$)$_2$]$_{\overline{2}}$S$_4$ |

The polysiloxane usable in the present invention may further be synthesized by a reaction between polysiloxane having a reactive functional group at its side chain or terminal and a silane coupling agent of Table I. Examples of the polysiloxane having a reactive functional group, are an epoxy group, amine group, mercapto group, carboxyl group, etc.

Note that the polysiloxane used in the present invention, as explained above, is not particularly limited in its terminal groups and side chains and is determined by the type of the starting material used during manufacture.

The amount of the polysiloxane used in the first aspect of the present invention is preferably 100% by weight or less, preferably 1 to 100% by weight, particularly preferably 2 to 40% by weight, of the weight of the filler in the rubber composition. When the content of the polysiloxane is too small, the desired effect cannot be obtained, while conversely if too great, substances not bonding with the filler (e.g., silica) will leak out from the vulcanized product in some cases, which is not desired.

Although there are no specific limitations to the amount of the filler to be kneaded, preferably 5 to 150 parts by weight, more preferably 20 to 120 parts by weight, particularly preferably 50 to 90 parts by weight of the filler based upon 100 parts by weight of the rubber component can be used.

The rubber contained as the main ingredient in the vulcanizable rubber composition according to the present invention may be any rubber generally contained in various rubber compositions in the past, for example, natural rubber (NR), polyisoprene rubber (IR), various styrene-butadiene copolymer rubbers (SBR), various polybutadiene rubbers (BR), acrylonitrile-butadiene copolymer rubbers (NBR), butyl rubber (IIR), and other diene rubbers or ethylene-propylene copolymer rubbers (EPR, EPDM) etc. alone or as any blends.

The vulcanizable rubber composition according to a preferred mode of the second aspect of the present invention further contains a silane coupling agent. The silane coupling agent used in the present invention may be made any silane coupling agent used together with silica fillers in the past. The typical examples are shown in Table I. Of these, bis-[3-(triethoxysilyl)-propyl]tetrasulfide and the silane coupling agents shown in Table I' below is most preferred from the viewpoint of the processability.

When a silane coupling agent is mixed into the vulcanizing rubber composition according to the present invention, it is possible to reduce the amount of the silane coupling agent used compared with the past and it is possible to further improve the abrasion resistance. The preferable amount of the silane coupling agent used in the present invention is 40% by weight or less, preferably 0.5 to 40% by weight, particularly preferably 1 to 20% by weight, based upon the amount of the silica in the composition. When the amount of the silane coupling agent is too small, the desired effects cannot be obtained, while conversely when too great, scorching will easily occur in the mixing or extrusion step, which is not desirable.

According to the second aspect of the present invention, there is provided a rubber compounding agent including (A) a polysiloxane containing the following alkoxysilyl group (I) and/or acyloxysilyl group (II) and having an average degree of polymerization of 3 to 10,000 and (B) a silane coupling agent in a ratio of (A)/(B)=95/5 to 5/95:

$$\equiv \text{Si}-\text{OR}^1 \qquad \text{(I)}$$

$$\equiv \text{Si}-\text{OCOR}^2 \qquad \text{(II)}$$

wherein R$^1$ and R$^2$ are the same as explained above.

According to the second aspect of the present invention, there is provided a rubber compounding agent wherein the polysiloxane (A) is impregnated in (C) at least one powder in a ratio of (A)/(C)=70/30 to 5/95.

According to the second aspect of the present invention, there is provided a rubber composition comprising 100 parts by weight of the starting rubber, 5 to 100 parts by weight of silica, and an amount of the rubber compounding agent composed of (A) and (B) or (A) and (C) to give a content of the polysiloxane contained therein of 0.2 to 30% by weight in the total composition.

As mentioned above, if a polysiloxane (A) having an alkoxysilyl group or acyloxysilyl group of the formula (I) or (II) is blended in a rubber composition, the alkoxysilyl groups (I) or the acyloxysilyl groups (II) react with the silanol groups and cover the surface of the silica particles, and therefore, the problems in the prior art are solved and it is possible to effectively suppress the rise in viscosity caused by the cohesiveness and polarity of the silanol groups and the wasted consumption of the vulcanization accelerator or other polarized additives or silane coupling agent etc. However, the silane coupling agent for increasing the reinforcing nature of the silica and the polysiloxane for improving the processability of the silica both react with the silanol groups on the surface of the silica in competitive reactions. Thus, we found that the physical properties of the rubber differed depending on the method of mixture (or order). That is, if the silica and polysiloxane react first, the reinforcing nature falls, which is not desirable. Therefore, in the present invention, the coupling agent and polysiloxane are mixed in advance into the rubber, so reaction of just the polysiloxane first is prevented or the polysiloxane is pre-impregnated into carbon black or another nonreactive filler (i.e., inert powder) or silica or another powder so as to delay the reaction with the silica and thereby prevent a decline in the vulcanized physical properties of the rubber.

The polysiloxane (A) containing the alkoxysilyl groups (I) or acyloxysilyl groups (II) blended in the rubber composition according to the present invention, as mentioned above, must have an alkoxysilyl group (I) and/or acyloxysilyl group (II) reacting with a silanol group and be a polymer (or oligomer) of a size covering the surface of the silica particles and exhibit a lubricating effect, for example, an average degree of polymerization of 3 to 10,000, preferably 10 to 1,000. Accordingly, in the polysiloxane (A) used in the present invention, it is essential that a $\equiv$Si—O—R$^1$ group or $\equiv$Si—OCOR$^2$ group be present. These groups may be at the main chain, side chains, or ends. Further, a hydrogen group or other organic group is also possible. The polysiloxane is a known substance, as mentioned above.

The polysiloxane (A) used in the present invention may further be synthesized by a reaction between polysiloxane having a reactive functional group at its side chain or terminal and a silane coupling agent of Table I. As the polysiloxane having a reactive functional group, mention may be made of an epoxy group, amine group, mercapto group, carboxyl group, etc., also as mentioned above.

Note that the polysiloxane (A) used in the present invention, as explained above, is not particularly limited in its terminal groups and side chains and is determined by the type of the feedstock used during manufacture.

The polysiloxane (A) used in the present invention is mixed in to give 0.2 to 30% by weight, preferably 1.0 to 10% by weight, based upon the rubber composition. If the content of the polysiloxane (A) is too small, the desired effect cannot be obtained, while conversely if too great, substances not bonding with the silica will leak out from the vulcanized product in some cases, which is not desired.

The rubber contained as the main ingredient in the vulcanizing rubber composition according to the present invention may be any rubber generally contained in various rubber compositions in the past, as mentioned above.

The silane coupling agent (B) used in the vulcanizing rubber composition of the present invention may be made any silane coupling agent used together with silica fillers in the past. As typical examples, any agent shown in Table I may be mentioned. Of these, bis-[3-(triethoxysilica)-propyl] tetrasulfide and the silane coupling agents shown in Table I' below is most preferred from the viewpoint of the processability.

If a silane coupling agent (B) is mixed into the vulcanizing rubber composition according to the present invention, it is possible to reduce the amount of the silane coupling agent (B) used compared with the past and it is possible to further improve the abrasion resistance. The preferable amount of the silane coupling agent (B) used in the present invention is, in terms of a ratio (ratio by weight) of the polysiloxane (A) in the composition and the silane coupling agent (B) of 95/5 to 5/95, particularly preferably 60/40 to 80/20. If the amount of the silane coupling agent (B) is too small, the desired effects cannot be obtained, while conversely if too great, scorching will easily occur in the mixing or extrusion step, which is not desirable.

The rubber composition of the second embodiment according to the second aspect of the present invention is composed of at least one powder (C) generally mixed with rubber compositions in the past mixed with the polysiloxane (A). Examples of the powder (C) are carbon black, calcium carbonate, stearic acid, and other inert powders, silica, etc. Here, "inert powder" means a powder with a small reactivity with the polysiloxane (A) of the present invention. The amount of this inert powder (C) is, in terms of the ratio of weight of (A)/(C), 70/30 to 5/95, more preferably 60/40 to 30/70. If the amount of the inert powder is too small, the silica and polysiloxane will react overly fast, whereby the reinforcing property will fall, which is not desirable, while conversely when too great, the effect of surface treatment of the polysiloxane on the silica will become smaller, which is also not desirable. The method of impregnation of the polysiloxane (A) to the powder (C) is not particularly limited, but use may be made of a mixer, kneader, mill, etc. usually used according to need.

The silica-containing rubber composition according to the present invention is composed of 5 to 100 parts by weight, preferably 5 to 80 parts by weight, of rubber use silica based upon 100 parts by weight of the starting rubber and an amount of the rubber compounding agent (that is, the premix of the polysiloxane (A) and the silane coupling agent (B) or powder (C)) so as to give 0.2 to 30% by weight, preferably 1 to 10% by weight, of polysiloxane (A) in the total composition.

The third aspect of the present invention provides a polysiloxane surface-treated metal oxide comprising 100 parts by weight of a metal oxide surface treated with 0.1–50 parts by weight of a polysiloxane having the following alkoxysilyl group (I) or acyloxysilyl group (II) and having an average degree of polymerization of 3 to 10,000:

wherein $R^1$ and $R^2$ are the same as explained above.

According to preferable embodiments of the third aspect, there is provided a polysiloxane surface-treated metal oxide, wherein the metal oxide is $SiO_2$ or $SiO_2$-containing metal oxide or wherein 0.05 to 50% by weight of a titanium catalyst, based upon the amount of the polysiloxane used, is further used during the surface treatment.

According to the third aspect, there is also provided a rubber composition comprising 100 parts by weight of a starting rubber and 5 to 100 parts by weight of the above-mentioned polysiloxane surface-treated metal oxide, preferably silica and optionally a silane coupling agent in an amount of 0.5–40% by weight of the amount of the silica is further contained in the composition.

As mentioned above, the polysiloxane containing the alkoxysilyl groups (I) or acyloxysilyl groups (II) according to the present invention, as mentioned above, must have an alkoxysilyl group (I) or acyloxysilyl group (II) reacting with a silanol group and be a polymer (or oligomer) of a size covering the surface of the silica particles and exhibit a lubricating effect, for example, an average degree of polymerization of 3 to 10,000, preferably 10 to 1,000. Accordingly, in the polysiloxane of the present invention, it is essential that a $\equiv Si-O-R^1$ group or $\equiv Si-OCOR^2$ group be present. These groups may be at the main chain, side chains, or ends. Further, a hydrogen group or other organic group is also possible. The polysiloxane is a known substance and can be synthesized by the reaction between an Si—H group containing polysiloxane and alcohol or carboxylic acid in the presence of a catalyst, as mentioned above.

The polysiloxane usable in the present invention may further be synthesized by a reaction between polysiloxane having a reactive functional group at its side chain or terminal and a silane coupling agent of Table I shown above. Examples of the polysiloxane having a reactive functional group, are an epoxy group, amine group, mercapto group, carboxyl group, etc.

Note that the polysiloxane used in the present invention, as explained above, is not particularly limited in its terminal groups and side chains and is determined by the type of the starting material used during manufacture. According to the present invention, the surface of the metal oxide is surface treated with the polysiloxane. The surface treating method is not specifically limited. Generally speaking, the metal oxide can be impregnated or coated with the polysiloxane at room temperature in an appropriate solvent (e.g., acetone, methanol, ethanol), followed by heat drying at room temperature to 120° C.

The amount of the polysiloxane to be used for the surface treatment according to the present invention is generally 0.1 to 50 parts by weight, preferably 1 to 20 parts by weight. If the amount of the polysiloxane is too small, the desired results cannot be obtained, while conversely it too large, the polysiloxane which does not react with the metal oxide is unpreferably exdudated from the vulcanized product.

When the surface-treated metal oxide is added in an amount of 5–100 parts by weight, preferably 10–80 parts by weight, to 100 parts by weight of the starting rubber, the desired reinforcing effects can be obtained. When the amount is less than 5 parts by weight, the desired effects of the present invention are not sufficient, while more than 100 parts by weight, the processability unpreferably becomes poor.

Examples of the metal oxides according to the present invention are metal oxides comprising a single metal such as silicon oxide, titanium oxide, aluminum oxide, iron oxide, zirconium oxide, cerium oxide and complex or composite oxides such as calcium silicate, aluminum silicate, magnesium silicate, zeolite, feldspar, kaolinite, clay, talc. Here, as the metal oxides conventionally used for rubber compounding, silicate fillers such as silicic anhydride, silicic hydrate, calcium silicate, aluminum silicate, kaolin, talc are preferable.

The titanium catalysts usable in the preferable embodiment of the present invention are titanium compounds such as alkoxy titanium, titanium chelate, titanium acylate, complex or composite titanate. As typical examples, the titanium compounds TA-10 and TC-100 (available from Matsumoto Koushou K.K. Japan) having the following structure can be effectively used.

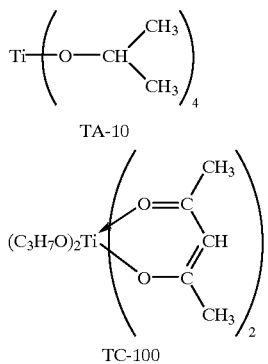

In the preferable embodiment of the third aspect of the present invention, the above titanium catalyst is used in an amount of 0.05 to 50% by weight, more preferably 0.1 to 10% by weight, of the amount of the polysiloxane. If the amount is too small, the desired effect of the surface treatment cannot be efficiently obtained, while conversely too large, the processability tends to be decreased when the rubber composition is prepared.

The rubber contained as the main ingredient in the vulcanizable rubber composition according to the present invention may be any conventional rubber as mentioned previously.

The vulcanizable rubber composition according to a preferred mode of the third aspect of the present invention may further contains a silane coupling agent. The silane coupling agent usable in the present invention may be any silane coupling agent used together with silica fillers in the past. The typical examples, are shown in Table I. Further, the following special sulfur-containing silane coupling agents shown in Table I' below can also be used. Of these, bis-[3-(triethoxysilica)-propyl]tetrasulfide is most preferred from the viewpoint of the processability.

TABLE I'

| Chemical name | Structural formula |
|---|---|
| 3-Trimethoxysilylpropyl-N,N-dimethyl thiocarbamoyl tetrasulfide | $(CH_3O)_8SiC_2H_5S_4CN(CH_3)(CH_3)$, C=S |
| Trimethoxysilylpropyl-mercaptobenz-thiazole tetrasulfide | $(CH_3O)_3SiC_8H_4S_4$—benzothiazole |
| Thiethoxysilylpropyl-methacrylate monosulfide | $(C_2H_5O)_3SiC_8H_4SCC(CH_3)=O$ |
| Dimethoxymethylsilylpropyl-N,N-dimethylthiocarbamoyl tetrasulfide | $(CH_3O)_2SiC_2H_5S_4CN(CH_3)(CH_3)$, $CH_3$ S |

When a silane coupling agent is mixed into the vulcanizing rubber composition according to the third aspect of the present invention, it is possible to improve the abrasion resistance. The preferable amount of the silane coupling agent usable in the present invention is 1 to 20% by weight, preferably 2 to 10% by weight, based upon the amount of the silica in the composition. When the amount of the silane coupling agent is too small, the desired effects cannot be obtained, while conversely when too large, scorching will easily occur in the mixing or extrusion step, which is not desirable.

According to the fourth aspect of the present invention, there is provided a rubber composition for a tire tread including 100 parts by weight of a diene rubber, 2 to 80 parts by weight, preferably 5 to 60 parts by weight, of carbon black, 5 to 80 parts by weight, preferably 10 to 50 parts by weight, of silica, a silane coupling agent, and the polysiloxane mentioned below. Examples of such a polysiloxane has repeating units of the formula (III):

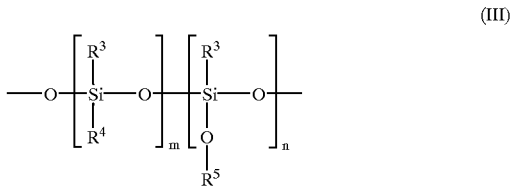

(III)

wherein, $R^3$ represents independently a methyl group, ethyl group, or phenyl group, $R^4$ indicates independently hydrogen or an organic group (e.g., methyl, phenylethyl, 2-(4-methyl-3-cyclohexenyl)-propyl, 2,4-diphenyl-4-methylpentyl, $R^5$ indicates independently an alkyl group or acyl group, m is 0 or an integer of 1 or more, and n is an integer of 1 or more.

In accordance with a preferred embodiment the fourth of the present invention, there is provided a rubber composition for a tire tread as mentioned above, wherein the amounts of the polysiloxane and silane coupling agent are:

$0.5 \leq (W_{PS}/W_{SC}) \leq 7$

Content of silica×1 wt % $\leq W_{PS} + W_{SC} \leq$

Content of silica×40 wt % wherein, $W_{PS}$: content of polysiloxane (parts by weight), and $W_{SC}$: content of silane coupling agent (parts by weight).

According to a preferred embodiment of the fourth aspect of the present invention, there is provided a rubber composition for a tire tread as mentioned above, wherein the compound except for the vulcanization system is obtained by mixing at a temperature of at least 120° C. in a simultaneous step.

As explained above, there was the problem that the vulcanized properties of the tire tread containing silica were excellent, but the processability at the time when unvulcanized was poor.

However, according to the present invention, since a polysiloxane having the repeating structural units of the above formula (III) is blended into the rubber composition, the alkoxysiloxane reacts with the silanol groups and covers the surface of the silica particles, and therefore, the problems in the prior art are solved and it is possible to effectively suppress the rise in viscosity caused by the cohesiveness and polarity of the silanol groups and the wasted consumption of the vulcanization accelerator or other polarized additives or silane coupling agent etc.

The polysiloxane of the above formula (III) contained in the rubber composition according to the present invention, as mentioned above, must have an alkoxysilyl group or acyloxysilyl group reacting with a silanol group and be a polymer (or oligomer) of a size covering the surface of the silica particles and exhibit a lubricating effect, for example, an average degree of polymerization of 3 to 10,000, preferably 10 to 1,000. Accordingly, in the repeating unit of the above formula (III), it is essential that a $\equiv$Si—O—$R^3$ group be present. Accordingly, n should be at least 1, preferably 5 to 1000 and m may be zero, but a hydrogen group or other organic group is also possible. The polysiloxane is a known substance. For example, it may be manufactured as follows:

The compound having the siloxane structure of formula (III) is synthesized by causing a reaction between the corresponding polyalkylhydrogensiloxane and alcohol or carboxylic acid in the presence of a catalyst. Examples of the polyalkylhydrogensiloxane are those mentioned above.

The polysiloxane used in the present invention, as explained above, is not particularly limited in its terminal groups and is determined by the type of the feedstock used during manufacture. For example, it may have a trimethylsilyl group, methyldiphenylsilyl group, triphenylsilyl group, and also organic groups.

In formula (III), as mentioned above, $R^1$ represents a methyl group, ethyl group, or phenyl group, and $R^2$ represents hydrogen or an organic group, for example, $CH_3$, $C_2H_5$, styrene residue, divinylbenzene residue, limonene residue, butadiene residue, isoprene residue, etc.

The diene rubber contained as the main ingredient in the vulcanizing rubber composition according to the present invention may be any diene rubber generally contained in various rubber compositions as mentioned above.

The silane coupling agent used in the present invention may be made any silane coupling agent used together with silica fillers in the past. Typical examples are shown in Table I above. Of these, bis-[3-(triethoxysilica)-propyl]tetrasulfide is most preferred from the viewpoint of the processability.

The amounts of the polysiloxane and silane coupling agent used in the present invention are a total weight of the polysiloxane and silane coupling agent of 0.5 to 40% by weight, preferably 1 to 20% by weight based upon the amount of the silica, and a weight ratio (of polysiloxane/silane coupling agent) of 0.5 to 7, preferably a range of 1 to 4. If the amount of the polysiloxane is too small, the desired effects cannot be obtained, while conversely if too great, the substances not bonding with the silica will leak out from the vulcanized product in some cases, which is not desirable.

Further, if the amount of the silane coupling agent is too small, the desired effects cannot be obtained, while conversely if too great, scorching will easily occur in the mixing or extrusion step, which is not desirable.

Note that when the silica and carbon black are mixed in the same step in accordance with the preferred embodiment of the present invention, sufficient contact and reaction occur between the diene rubber and carbon black and the mixing is promoted, but sufficient contact and reaction are not obtained between the diene rubber and silica due to the polarity of the silanol groups on the surface of the silica and therefore knitting, scorching, etc. occur at the time of mixture and the dispersion also becomes poor.

Further, when separately mixing the silica and carbon black, for example, when mixing the silica in the first step and adding the carbon black and other compounding agents in the second step, there is not sufficient promotion of mixture of the diene rubber and carbon black in the second step and it is difficult to obtain the inherent reinforcement of the carbon black in some cases. As mentioned above, therefore, according to the present invention, by adding a silane coupling agent and the polysiloxane shown in formula (I), the knitting and scorching at the time of mixing in a simultaneous step are improved and the dispersion promoted and it is possible to obtain the same or better performance as the case of mixing the silica and carbon by separate steps.

The rubber composition according to the first aspect of the present invention may contain, in addition to the above-mentioned essential ingredients, a vulcanization or cross-linking agent, a vulcanization or cross-linking accelerator, various types of oils, an antiaging agent, reinforcing agent, plasticizer, softening agent, or other various additives generally mixed into general rubbers. The compounds are kneaded and vulcanized by general methods to make the composition which may then be used for vulcanization or cross-linking. The amounts of these additives added may be made the amounts generally added in the past so long as they do not run counter to the object of the present invention.

EXAMPLES

The present invention will now be further illustrated by, but is by no means limited to, the following Examples.

Example I

The various polysiloxanes shown by general formula were synthesized by the following general methods:

Polysiloxane 1

100 g of polymethylhydrogensiloxane (KF99, made by Shinetsu Chemical Industry) and 42.5 g of methanol were mixed, 40 μl of 1% isopropyl alcohol solution of chloroplatinic acid was added, and a reaction was caused at 80° C. for 10 hours to synthesize the polysiloxane 2.

Polysiloxane 2

100 g of polymethylhydrogensiloxane (KF99, made by Shinetsu Chemical Industry) and 60 g of ethanol were mixed, 40 μl of 1% isopropyl alcohol solution of chloroplatinic acid was added, and a reaction was caused at 80° C. for 10 hours to synthesize the polysiloxane 2.

Polysiloxane 3

To a mixture of 180 g of ethanol and 200 μl of a 1% isopropyl alcohol solution of chloroplatinic acid was dropped 200 g of polymethylhydrogensiloxane (KF99, made by Shinetsu Chemical Industry) over 3 hours. The mixture was then caused to react at 80° C. for 10 hours to synthesize the polysiloxane. After this, the excessive ethanol was distilled off under reduced pressure.

Polysiloxane 4

100 g of polymethylhydrogensiloxane (KF99, made by Shinetsu Chemical Industry) and 60 g of ethanol were mixed, 40 μl of 1% isopropyl alcohol solution of chloroplatinic acid was added, a reaction was caused at 80° C. for 8 hours, 68 g of styrene and 40 μl of 1% isopropyl alcohol solution of chloroplatinic acid were added, and a reaction was caused at the same temperature for 3 hours to synthesize the polysiloxane.

Polysiloxane 5

100 g of polymethylhydrogensiloxane (KF99, made by Shinetsu Chemical Industry) and 78 g of ethanol were mixed, 40 μl of 1% isopropyl alcohol solution of chloroplatinic acid was added, a reaction was caused at 80° C. for 8 hours, 70 g of divinyl benzene and 40 μl of 1% isopropyl alcohol solution of chloroplatinic acid were added, and a reaction was caused at the same temperature for 3 hours to synthesize the polysiloxane.

Polysiloxane 6

100 g of polymethylhydrogensiloxane (KF99, made by Shinetsu Chemical Industry) and 60 g of ethanol were mixed, 40 μl of 1% isopropyl alcohol solution of chloroplatinic acid was added, a reaction was caused at 80° C. for 8 hours, 88 g of limonene and 40 μl of 1% isopropyl alcohol solution of chloroplatinic acid were added, and a reaction was caused at the same temperature for 3 hours to synthesize the polysiloxane.

The polysiloxanes 1 to 6 obtained above are deduced to have the following structures:

$$CH_3-\underset{\underset{CH_3}{|}}{\overset{\overset{CH_3}{|}}{Si}}-O\left(\underset{\underset{R}{|}}{\overset{\overset{CH_3}{|}}{Si}}-O\right)_p\left(\underset{\underset{OR'}{|}}{\overset{\overset{CH_3}{|}}{Si}}-O\right)_q\underset{\underset{CH_3}{|}}{\overset{\overset{CH_3}{|}}{Si}}-CH_3 \quad (IV)$$

| Polysiloxane no. | R | R' | p:q | (p + q) | Remarks |
|---|---|---|---|---|---|
| 1 | H | CH₃ | 21:79 | 40 | p = 0 |
| 2 | H | C₂H₅ | 21:79 | 40 | |
| 3 | — | C₂H₅ | — | 40 | |
| 4 | Styrene residue | C₂H₅ | 10:90 | 40 | |
| 5 | Divinyl benzene residue | C₂H₅ | 10:90 | 40 | |
| 6 | Limonene residue | C₂H₅ | 10:90 | 40 | |

Polysiloxane 7

200 g of polymethylhydrogensiloxane (KF99, made by Shinetsu Chemical Industry) and 49 g of vinyltrimethoxysilane (KBM1003, made by Shinetsu Chemical Industry) were mixed, 100 μl of 1% isopropyl alcohol solution of chloroplatinic acid was added, and a reaction was caused at 80° C. for 5 hours to synthesize the polysiloxane.

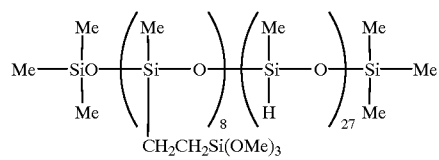

Polysiloxane 8

100 g of silanol terminated polymethylhydrogensiloxane (molecular weight of 35000) and 20 g of tetramethoxysilane were mixed. To these was added 0.5 g of stannous dioctylate as a catalyst. The reaction was caused at 90° C. for 4 hours, followed by distilling off the residual tetramethoxysilane at the same temperature under reduced pressure.

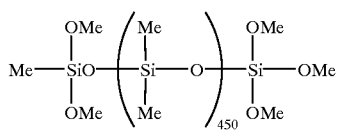

Polysiloxane 9

100 g of hydrogen terminated polymethylsiloxane (molecular weight of 726, Toshiba Silicone) and 40.8 g of vinyltrimethoxysilane (KBM1003, made by Shinetsu Chemical Industry) were mixed. To these was added 100 μl of 1% isopropyl alcohol solution of chloroplatinic acid was added, and a reaction was caused at 80° C. for 5 hours to synthesize the polysiloxane.

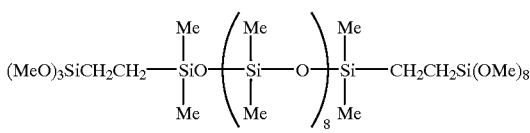

Polysiloxane 10

100 g of epoxy-modified silicone (made by Shinetsu Chemical Industry, X22-163A) and 47 g of γ-aminopropyltriethoxysilane were made to react at 60° C. for 4 hours, then the unreacted γ-aminopropyltriethoxysilane was distilled off at 90° C. under reduced pressure to obtain the polysiloxane.

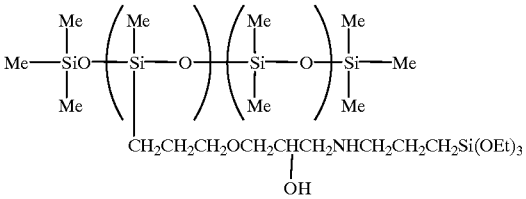

Polysiloxane 11

The MS56 of the following formula made by Mitsubishi Chemical was used as it was:

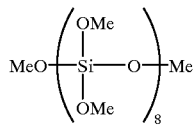

Polysiloxane 12

The polysiloxane having the following structure was synthesized.

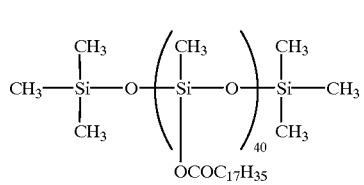

(IV)

The other ingredients used in the formulations of the following Standard Examples, Examples of the invention, and Comparative Examples were the following commercially available products:

Natural rubber: RSS#1

SBR: Nipol NS116 (Nihon Zeon)

Silica: Nipsil AQ (Nihon Silica)

Silane coupling agent: Si69 (Degussa) (chemical name: bis-[3-(triethoxylsilyl)-propyl]tetrasulfide)

Carbon black: Seast KH (Tokai Carbon)

Powdered sulfur: 5% oil treated powdered sulfur

Antioxidant 6C: N-phenyl-N'-(1,3-dimethylbutyl)-p-phenylenediamine

Vulcanization accelerator CZ: N-cyclohexyl-2-benzothiazylsulfenamide

Vulcanization accelerator DPG: Diphenylguanidine

Zinc oxide: Zinc White no. 3

Stearic acid: Industrial use stearic acid

Preparation of Samples

The components other than the vulcanization accelerator and the sulfur were mixed in a 1.8 liter internal mixer for 3 to 5 minutes. The vulcanization accelerator and sulfur were kneaded by an 8-inch open roll to the master batch discharged when reaching 165±5° C. to obtain the rubber composition. The unvulcanized physical properties of the obtained rubber composition were measured.

The composition was then pressed and vulcanized in a 15×15×0.2 cm mold at 160° C. for 20 minutes to prepare the desired test piece and the vulcanized physical properties were evaluated.

The test methods for the unvulcanized physical properties and vulcanized physical properties of the compositions obtained in the examples were as follows:

Unvulcanized Physical Properties

1) Kneading performance at mixer: Evaluated by kneading performance of master batch at time of discharge from mixer.

⊚ . . . Well kneaded mass with almost no powder not attached to rubber.

○ . . . Well kneaded mass, but powder not attached to rubber seen at scattered locations.

X . . . Small pieces of free rubber with powder attached observed.

2) Mooney viscosity: Measured at 100° C. based on JIS K 6300.

3) Vulcanization rate: Time to reach 95% vulcanization at 160° C. measured based on JIS K 6300.

4) Scorching time: Time for viscosity to rise 5 points at 125° C. measured based on JIS K 6300.

Vulcanized Physical Properties

1) Sheet skin: The vulcanized sheet was observed visually and ones with a smooth surface and gloss were judged as good.

2) 300% modules, tensile strength at break, and elongation at break: Measured in accordance with JIS K 6251 (dumbbell shape no. 3)

3) Abrasion resistance: Measured by Lambourn tester. Reduction in weight by abrasion indicated by index.

Abrasion resistance (index)=[(reduction in weight in Standard Example 10)/(reduction of weight at samples)]× 100

Example 1 (Standard Example) and Examples 2 to 3 (Examples of Invention)

These Examples show the results of evaluation of polysiloxanes in systems including silica and carbon black and not including silane coupling agents. The results are shown in Table II.

TABLE II

|  | Ex. 1[*1] | Ex. 2[*2] | Ex. 3[*2] |
| --- | --- | --- | --- |
| Formulation (parts by weight) | | | |
| Natural rubber | 50.0 | 50.0 | 50.0 |
| SBR | 50.0 | 50.0 | 50.0 |
| Polysiloxane 1 | — | 2.5 | — |
| Polysiloxane 2 | — | — | 2.5 |
| Silica | 25.0 | 25.0 | 25.0 |
| Carbon black | 25.0 | 25.0 | 25.0 |
| Diethylene glycol | 2.5 | 2.5 | 2.5 |
| Zinc oxide | 3.0 | 3.0 | 3.0 |
| Stearic acid | 1.0 | 1.0 | 1.0 |
| Antioxidant 6C | 1.0 | 1.0 | 1.0 |
| Powdered sulfur | 2.1 | 2.1 | 2.1 |
| Vulcanization accelerator CZ | 1.0 | 1.0 | 1.0 |
| Unvulcanized physical properties | | | |
| Kneading performance in mixer | X | ○ | ⊚ |
| Mooney viscosity | 116.8 | 90.0 | 92.8 |
| Vulcanization rate (min.) | 14.8 | 8.5 | 9.4 |
| Scorching time (min.) | 16.5 | 17.0 | 18.5 |
| Vulcanized physical properties | | | |
| Sheet skin | Good | Good | Good |
| 300% modulus (MPa) | 9.9 | 9.9 | 9.2 |
| Tensile Strength at break (MPa) | 20.6 | 23.1 | 19.6 |
| Elongation at break (%) | 497 | 516 | 484 |

[*1]standard example
[*2]example of invention.

Example 4 (Standard Example) and Examples 5 to 9 (Examples of Invention)

These Examples show the results of evaluation of polysiloxanes in systems not including carbon black and not including silane coupling agents.

The evaluation was made in the same way as Examples 1 to 3 with the formulations shown in Table III. The results are shown in Table III.

TABLE III

|  | Ex. 4[*1] | Ex. 5[*2] | Ex. 6[*2] | Ex. 7[*2] | Ex. 8[*2] | Ex. 9[*2] |
|---|---|---|---|---|---|---|
| Formulation (parts by weight) | | | | | | |
| Natural rubber | 50 | 50 | 50 | 50 | 50 | 50 |
| SBR | 50 | 50 | 50 | 50 | 50 | 50 |
| Silica | 50 | 50 | 50 | 50 | 50 | 50 |
| Polysiloxane 3 | — | 5 | — | — | — | — |
| Polysiloxane 4 | — | — | 5 | — | — | — |
| Polysiloxane 5 | — | — | — | 5 | — | — |
| Polysiloxane 6 | — | — | — | — | 5 | — |
| Polysiloxane 12 | — | — | — | — | — | 5 |
| Diethylene glycol | 2.5 | 2.5 | 2.5 | 2.5 | 2.5 | 2.5 |
| Zinc oxide | 3 | 3 | 3 | 3 | 3 | 3 |
| Stearic acid | 1 | 1 | 1 | 1 | 1 | 1 |
| Antioxidant 6C | 1 | 1 | 1 | 1 | 1 | 1 |
| Powdered sulfur | 1.7 | 1.7 | 1.7 | 1.7 | 1.7 | 1.7 |
| Vulcanization accelerator DPG | 0.5 | 0.5 | 0.5 | 0.5 | 0.5 | 0.5 |
| Vulcanization accelerator CZ | 1 | 1 | 1 | 1 | 1 | 1 |
| Unvulcanized physical properties | | | | | | |
| Kneading performance in mixer | X | ⊚ | ○ | ○ | ⊚ | ○ |
| Mooney viscosity | 152.4 | 81.6 | 89.2 | 94 | 80.4 | 70.2 |
| Vulcanization rate (min.) | 35.3 | 12.3 | 11.4 | 11.6 | 10.0 | 11.1 |
| Scorching time (min.) | 11.4 | 21.7 | 25.3 | 20.9 | 23.7 | 30.4 |
| Vulcanized physical properties | | | | | | |
| Sheet skin | Good | Good | Good | Good | Good | Good |
| 300% modulus (MPa) | 3.9 | 5.8 | 3.9 | 3.7 | 3.7 | 3.7 |
| Tensile Strength at break (MPa) | 20.1 | 22.2 | 20.2 | 20.2 | 20.3 | 20.4 |
| Elongation at break (%) | 723 | 729 | 738 | 745 | 720 | 723 |

[*1]standard example
[*2]example of invention.

Example 10 (Standard Example), Examples 11 to 15 (Examples of Invention), Example 16 (Comparative Examples, and Examples 17 to 21 (Examples of Invention)

These Examples show the results of evaluation of polysiloxanes in systems including silica and a silane coupling agent but not including carbon black.

The evaluation was made in the same way as Examples 1 to 3 with the formulations shown in Table IV. The results are shown in Table IV.

TABLE IV

|  | Ex. 10[*1] | Ex. 11[*2] | Ex. 12[*2] | Ex. 13[*2] | Ex. 14[*2] | Ex. 15[*2] | Ex. 16[*3] |
|---|---|---|---|---|---|---|---|
| Formulation (parts by weight) | | | | | | | |
| Natural rubber | 50.0 | 50.0 | 50.0 | 50.0 | 50.0 | 50.0 | 50.0 |
| SBR | 50.0 | 50.0 | 50.0 | 50.0 | 50.0 | 50.0 | 50.0 |
| Silica | 50.0 | 50.0 | 50.0 | 50.0 | 50.0 | 50.0 | 50.0 |
| Silane coupling agent | 2.5 | 2.5 | 2.5 | 2.5 | 2.5 | 2.5 | 2.5 |
| Polysiloxane 3 | — | 2.5 | — | — | — | — | — |
| Polysiloxane 4 | — | — | 2.5 | — | — | — | — |
| Polysiloxane 5 | — | — | — | 2.5 | — | — | — |
| Polysiloxane 6 | — | — | — | — | 2.5 | — | — |
| Polysiloxane 12 | — | — | — | — | — | 2.5 | — |
| Silicone oil[*4] | — | — | — | — | — | — | 2.5 |
| Zinc oxide | 3.0 | 3.0 | 3.0 | 3.0 | 3.0 | 3.0 | 3.0 |
| Stearic acid | 1.0 | 1.0 | 1.0 | 1.0 | 1.0 | 1.0 | 1.0 |
| Antioxidant 6C | 1.0 | 1.0 | 1.0 | 1.0 | 1.0 | 1.0 | 1.0 |
| Powdered sulfur | 1.7 | 1.7 | 1.7 | 1.7 | 1.7 | 1.7 | 1.7 |
| Vulcanization accelerator DPG | 0.5 | 0.5 | 0.5 | 0.5 | 0.5 | 0.5 | 0.5 |
| Vulcanization accelerator CZ | 1.0 | 1.0 | 1.0 | 1.0 | 1.0 | 1.0 | 1.0 |

TABLE IV-continued

| Unvulcanized physical properties | | | | | | | |
|---|---|---|---|---|---|---|---|
| Kneading performance in mixer | X | ⊚ | ○ | ○ | ⊚ | ○ | X |
| Mooney viscosity | 101.2 | 83.6 | 91.6 | 86.4 | 83.2 | 78.0 | 86.4 |
| Vulcanization rate (min.) | 21.9 | 17.7 | 19.2 | 21.0 | 18.3 | 10.2 | 12.2 |
| Scorching time (min.) | 11.8 | 20.2 | 12.6 | 16.4 | 17.7 | 11.8 | 8.9 |
| Vulcanized physical properties | | | | | | | |
| Sheet skin | Good | Good | Good | Good | Good | Good | Foam |
| 300% modulus (MPa) | 10.6 | 11.1 | 10.3 | 10.7 | 10.5 | 10.1 | Not measurable |
| Tensile Strength at break (MPa) | 22.3 | 21.1 | 21.5 | 21.4 | 22.2 | 23.1 | Not measurable |
| Elongation at break (Z) | 476 | 475 | 496 | 491 | 512 | 581 | Not measurable |
| Abrasion resistance (index) | 100 | 123 | 104 | 103 | 109 | 101 | Not measurable |

| | Ex. 17[*2] | Ex. 18[*2] | Ex. 19[*2] | Ex. 20[*2] | Ex. 21[*2] |
|---|---|---|---|---|---|
| Formulation (parts by weight) | | | | | |
| Natural rubber | 50 | 50 | 50 | 50 | 50 |
| SBR | 50 | 50 | 50 | 50 | 50 |
| Silica | 50 | 50 | 50 | 50 | 50 |
| Silane coupling agent | 2.5 | 2.5 | 2.5 | 2.5 | 2.5 |
| Polysiloxane 7 | 2.5 | — | — | — | — |
| Polysiloxane 8 | — | 2.5 | — | — | — |
| Polysiloxane 9 | — | — | 2.5 | — | — |
| Polysiloxane 10 | — | — | — | 2.5 | — |
| Polysiloxane 11 | — | — | — | — | 2.5 |
| Zinc oxide | 3.0 | 3.0 | 3.0 | 3.0 | 3.0 |
| Stearic acid | 1.0 | 1.0 | 1.0 | 1.0 | 1.0 |
| Antioxidant 6C | 1.0 | 1.0 | 1.0 | 1.0 | 1.0 |
| Powdered sulfur | 1.7 | 1.7 | 1.7 | 1.7 | 1.7 |
| Vulcanization accelerator DPG | 0.5 | 0.5 | 0.5 | 0.5 | 0.5 |
| Vulcanization accelerator CZ | 1.0 | 1.0 | 1.0 | 1.0 | 1.0 |
| Unvulcanized physical properties | | | | | |
| Kneading performance in mixer | ⊚ | ⊚ | ⊚ | ⊚ | ○ |
| Mooney viscosity | 83.2 | 72.3 | 73.4 | 80.5 | 103.3 |
| Vulcanization rate (min.) | 15.2 | 18.5 | 18.7 | 19.8 | 23.3 |
| Scorching time (min.) | 12.8 | 13.2 | 13.9 | 12.7 | 9.8 |
| Vulcanized physical properties | | | | | |
| Sheet skin | Good | Good | Good | Good | Good |
| 300% modulus (MPa) | 11.0 | 11.3 | 10.2 | 11.1 | 10.8 |
| Tensile Strength at break (MPa) | 23.6 | 23.6 | 22.3 | 22.4 | 21.9 |
| Elongation at break (%) | 507 | 507 | 557 | 501 | 523 |
| Abrasion resistance (index) | 102 | 108 | 120 | 113 | 105 |

[*1]standard example
[*2]example of invention
[*3]comparative example
[*4]silicone oil (KF99) (made by Shinetsu Chemical Industry)

As explained above, according to the present invention, by mixing into the rubber composition a polysiloxane containing an alkoxysilyl group (I) or an acyloxysilyl group (II) together with the silica, it is possible to remarkably improve the processability of the unvulcanized rubber composition as shown by Examples 2 to 3 and Examples 5 to 9 and by making joint use of a silane coupling agent, the processability of the unvulcanized rubber composition is remarkably improved and the abrasion resistance is also improved as shown in Examples 11 to 15 and 17 to 21. Note that as shown in Example 16 (Comparative Example), when a silicone oil is mixed in, the rubber sheet foams and cannot be used for practical applications.

Example II

The other ingredients used in the formulations of the following standard Examples, Examples of the Invention, and Comparative Examples were the following commercially available products:

Natural rubber: RSS#1
SBR: Nipol NS116 (Nihon Zeon)
  NP9528 (33.3% oil developed product, made by Nihon Zeon)
  NP1730 (33.3% oil developed product, made by Nihon Zeon)
BR: NP1220 (made by Nihon Zeon)
Silica: Nipsil AQ (Nihon Silica)
Silane coupling agent: Si69 (Degussa) (chemical name: bis-[3-(triethoxysilyl)-propyl]tetrasulfide)
Polysiloxane: Polymethylethoxysiloxane
Carbon black 1: Seast KH (Tokai Carbon)
Carbon black 2: Seast 9M (Tokai Carbon)

Production of Treatment Agent Polymethylethoxysiloxane (i.e., polysiloxane 13)

100 g of polymethylhydrogensiloxane (KF99 made by Shinetsu Chemical Industry) was added dropwise at 70° C. for 1 hour to 75 g of ethanol and 100 μl of a 1% isopropyl solution of chloroplatinic acid. After the addition ended, the solution was made to react for 8 hours to produce the polymethylethoxysiloxane of the following structure formula. The reactivity was 90%.

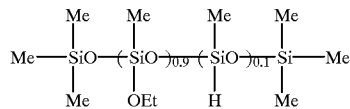

Powdered sulfur: 5% oil treated powdered sulfur

Antioxidant 6C: N-phenyl-N'-(1,3-dimethylbutyl)-p-phenylenediamine

Vulcanization accelerator CZ: N-cyclohexyl-2-benzothiazylsulfenamide

Vulcanization accelerator DPG: Diphenylguanidine

Zinc oxide: Zinc White no. 3

Stearic acid: Industrial use stearic acid

Preparation of Samples

Of the ingredients shown in Tables V, VI, and VII, first the ingredients for mixture in the first step were mixed in a 1.8 liter internal mixer for 3 to 5 minutes. The ingredients of the second step were mixed into the master batch discharged when reaching 165±5° C. To this were kneaded the vulcanization accelerator and sulfur by an 8-inch open roll to obtain the rubber composition. The obtained rubber composition was pressed and vulcanized in a 15×15×0.2 cm mold at 160° C. for 20 minutes to prepare the desired test piece (rubber sheet) and the vulcanized physical properties were evaluated.

The test methods for the unvulcanized physical properties and vulcanized physical properties of the compositions obtained in the Examples were as follows:

Vulcanized Physical Properties 1) 300% modulus, tensile strength at break, and elongation at break: Measured in accordance with JIS K 6251 (dumbbell shape no. 3)

2) tanδ: Measured by viscoelasticity apparatus Rheograph Solid made by Toyo Seiki Seisakusho at 20 Hz, initial elongation of 10%, and dynamic strain of 2% (measured at sample width 5 mm and temperatures of 0° C. and 60° C.).

3) Abrasion resistance: Measured by Lambourn tester. Reduction in weight by abrasion indicated by index.

Abrasion resistance (index)=[(reduction in weight in Standard Example 30)/(reduction of weight at samples)]× 100

Examples 22 to 23 (Standard Example) and Examples 24 and 26 (Examples of Invention)

These Examples show the results of evaluation of mixtures of polysiloxanes and silane coupling agents and mixtures of polysiloxanes and carbon in systems of NR and SBR. The formulations and results of the evaluation are shown in Table V.

TABLE V

|  | Ex. 22[*1] | Ex. 23[*1] | Ex. 24[*2] | Ex. 25[*2] | Ex. 26[*2] |
|---|---|---|---|---|---|
| First step |  |  |  |  |  |
| Natural rubber (RSS#1) | 50.0 | 50.0 | 50.0 | 50.0 | 50.0 |
| SBR (NS116) | 50.0 | 50.0 | 50.0 | 50.0 | 50.0 |
| Silica | 50.0 | 50.0 | 50.0 | 50.0 | 50.0 |
| Diethylene glycol | 2.5 | 2.5 | 2.5 | 2.5 | 2.5 |
| Silane coupling agent | — | 2.5 | — | 2.5 | 2.5 |
| Polysiloxane 13 | 2.5 | — | — | 2.5 | — |
| Polysiloxane 13/silane coupling agent (1/1) mixture | — | — | 5.0 | — | — |
| Carbon black 1/polysiloxane (1/1) mixture | — | — | — | — | 5.0 |
| Carbon black 1 | — | — | — | 2.5 | — |
| Zinc oxide | 3.0 | 3.0 | 3.0 | 3.0 | 3.0 |
| Stearic acid | 1.0 | 1.0 | 1.0 | 1.0 | 1.0 |
| Antioxidant 6C | 1.0 | 1.0 | 1.0 | 1.0 | 1.0 |
| Second step |  |  |  |  |  |
| Silane coupling agent | 2.5 | — | — | — | — |
| Polysiloxane 13 | — | 2.5 | — | — | — |
| Final step |  |  |  |  |  |
| Powdered sulfur | 1.5 | 1.5 | 1.5 | 1.5 | 1.5 |
| Vulcanization accelerator DPG | 1.0 | 1.0 | 1.0 | 1.0 | 1.0 |
| Vulcanization accelerator CZ | 0.3 | 0.3 | 0.3 | 0.3 | 0.3 |

TABLE V-continued

|  | Ex. 22[*1] | Ex. 23[*1] | Ex. 24[*2] | Ex. 25[*2] | Ex. 26[*2] |
| --- | --- | --- | --- | --- | --- |
| Vulcanized physical properties |  |  |  |  |  |
| 300% modulus (MPa) | 9.2 | 9.5 | 9.7 | 10.2 | 10.5 |
| Tensile Strength at break (MPa) | 21.6 | 23.5 | 24.1 | 22.8 | 23.2 |
| Elongation at break (%) | 516 | 560 | 570 | 514 | 537 |
| tanδ (0° C.) | 0.54 | 0.56 | 0.54 | 0.55 | 0.54 |
| tanδ (60° C.) | 0.15 | 0.16 | 0.14 | 0.15 | 0.14 |
| tan δ gradient (0° C./60° C.) | 3.60 | 3.50 | 3.86 | 3.67 | 3.86 |
| Abrasion resistance (index) | 100 | 106 | 108 | 100 | 105 |

[*1]standard example
[*2]example of invention.

Examples 27 and 28 and 30 (Standard Example) and Examples 29 and 31 (Examples of Invention)

These Examples show the results of evaluation of mixtures of polysiloxanes and silane coupling agents and mixtures of polysiloxanes and carbon in systems of NR and BR. The formulations and results of the evaluation are shown in Table VI.

Examples 32, 33, 35 and 37 (Standard Example) and Examples 34, 36, and 38 (Examples of Invention)

These Examples show the results of evaluation of mixtures of polysiloxanes and silane coupling agents and mixtures of polysiloxanes and carbon in systems of SBR.

TABLE VI

|  | Ex. 27[*1] | Ex. 28[*1] | Ex. 29[*2] | Ex. 30[*1] | Ex. 31[*2] |
| --- | --- | --- | --- | --- | --- |
| First step |  |  |  |  |  |
| Natural rubber (RSS#1) | 60.0 | 60.0 | 60.0 | 60.0 | 60.0 |
| BR (NP1220) | 40.0 | 40.0 | 40.0 | 40.0 | 40.0 |
| Silica | 20.0 | 20.0 | 20.0 | 20.0 | 20.0 |
| Diethylene glycol | 1.5 | 1.5 | 1.5 | 1.5 | 1.5 |
| Silane coupling agent | — | 1.0 | — | 1.0 | 1.0 |
| Polysiloxane 13 | 1.0 | — | — | 1.0 | — |
| Polysiloxane 13/silane coupling agent (1/1) mixture | — | — | 2.0 | — | — |
| Carbon black 1/polysiloxane (1/1) mixture | — | — | — | — | 2.0 |
| Carbon black 1 | — | — | — | 1.0 | — |
| Carbon black 2 | 40.0 | 40.0 | 40.0 | 40.0 | 40.0 |
| Zinc oxide | 5.0 | 5.0 | 5.0 | 5.0 | 5.0 |
| Stearic acid | 1.0 | 1.0 | 1.0 | 1.0 | 1.0 |
| Antioxidant 6C | 5.0 | 5.0 | 5.0 | 5.0 | 5.0 |
| Aromatic oil | 20.0 | 20.0 | 20.0 | 20.0 | 20.0 |
| Second step |  |  |  |  |  |
| Silane coupling agent | 1.0 | — | — | — | — |
| Polysiloxane 13 | — | 1.0 | — | — | — |
| Final step |  |  |  |  |  |
| Powdered sulfur | 1.0 | 1.0 | 1.0 | 1.0 | 1.0 |
| Vulcanization accelerator CZ | 1.0 | 1.0 | 1.0 | 1.0 | 1.0 |
| Vulcanized physical properties |  |  |  |  |  |
| 300% modulus (MPa) | 4.3 | 4.7 | 4.8 | 4.5 | 4.8 |
| Tensile Strength at break (MPa) | 16.0 | 17.8 | 18.1 | 17.2 | 17.9 |
| Elongation at break (%) | 758 | 772 | 775 | 761 | 781 |
| tanδ (0° C.) | 0.32 | 0.33 | 0.33 | 0.31 | 0.33 |
| tanδ (60° C.) | 0.26 | 0.26 | 0.26 | 0.26 | 0.26 |
| tan δ gradient (0° C./60° C.) | 1.23 | 1.27 | 1.27 | 1.19 | 1.27 |
| Abrasion resistance (index) | 100 | 103 | 107 | 100 | 106 |

[*1]standard example
[*2]example of invention.

TABLE VII

|  | Ex. 32[*1] | Ex. 33[*1] | Ex. 34[*2] | Ex. 35[*1] | Ex. 36[*2] | Ex. 37[*1] | Ex. 38[*2] |
|---|---|---|---|---|---|---|---|
| First step | | | | | | | |
| SBR (NP9528) | 100.0 | 100.0 | 100.0 | 100.0 | 100.0 | 100.0 | 100.0 |
| SBR (NP1730) | 40.0 | 40.0 | 40.0 | 40.0 | 40.0 | 40.0 | 40.0 |
| Silica | 20.0 | 20.0 | 20.0 | 20.0 | 20.0 | 20.0 | 20.0 |
| Diethylene glycol | 1.5 | 1.5 | 1.5 | 1.5 | 1.5 | 1.5 | 1.5 |
| Silane coupling agent | — | 1.0 | — | 1.0 | 1.0 | 1.0 | 1.0 |
| Polysiloxane 13 | 1.0 | — | — | 1.0 | — | 1.0 | — |
| Polysiloxane 13/silane coupling agent (1/1) mixture | — | — | 2.0 | — | — | — | — |
| Carbon black 1/polysiloxane (1/1) mixture | — | — | — | — | 2.0 | — | — |
| Carbon black 1 | — | — | — | 1.0 | — | — | — |
| Carbon black 2 | 70.0 | 70.0 | 70.0 | 70.0 | 70.0 | 70.0 | 70.0 |
| Silica[*3] | — | — | — | 1.0 | — | 1.0 | — |
| Zinc oxide | 3.0 | 3.0 | 3.0 | 3.0 | 3.0 | 3.0 | 3.0 |
| Stearic acid | 2.0 | 2.0 | 2.0 | 2.0 | 2.0 | 2.0 | 2.0 |
| Antioxidant 6C | 5.0 | 5.0 | 5.0 | 5.0 | 5.0 | 5.0 | 5.0 |
| Aromatic oil | 10.0 | 10.0 | 10.0 | 10.0 | 10.0 | 10.0 | 10.0 |
| Second step | | | | | | | |
| Silane coupling agent | 1.0 | — | — | — | — | — | — |
| Polysiloxane 13 | — | 1.0 | — | — | — | — | — |
| Final step | | | | | | | |
| Powdered sulfur | 2.0 | 2.0 | 2.0 | 2.0 | 2.0 | 2.0 | 2.0 |
| Vulcanization accelerator CZ | 2.0 | 2.0 | 2.0 | 2.0 | 2.0 | 2.0 | 2.0 |
| Vulcanized physical properties | | | | | | | |
| 300% modulus (MPa) | 9.8 | 10.7 | 10.8 | 10.5 | 10.7 | 10.4 | 10.6 |
| Tensile Strength at break (MPa) | 21.9 | 22.1 | 22.3 | 21.9 | 22.3 | 21.6 | 22.3 |
| Elongation at break (%) | 665 | 682 | 682 | 671 | 689 | 680 | 684 |
| tanδ (0° C.) | 0.74 | 0.74 | 0.74 | 0.73 | 0.73 | 0.74 | 0.73 |
| tanδ (60° C.) | 0.37 | 0.35 | 0.35 | 0.36 | 0.34 | 0.35 | 0.34 |
| tan δ gradient (0° C./60° C.) | 2.00 | 2.11 | 2.11 | 2.03 | 2.15 | 2.11 | 2.15 |
| Abrasion resistance (index) | 100 | 106 | 107 | 100 | 106 | 100 | 105 |

(Notes:
[*1]standard example and
[*2]example of invention.
[*3]charged independently without being impregnated elsewhere.)

As explained above, according to the present invention, by adding mixtures of a polysiloxane containing an alkoxysilyl group (I) or (II) and a silane coupling agent or inert filler, mixing becomes possible without overreaction with the silanol groups on the surface of the silica in one-step mixing and the physical properties (tensile strength, abrasion resistance, tanδ) are improved as shown in Examples 24, 26, Examples 29, 30, and Examples 34, 36 compared with Examples 22, 23 and 24, Examples 27, 28 and 30, and Examples 22 to 33 and 35. However, the superiority of the tanδ balance in the present invention is shown by the size of the gradient between 0° C. and 60° C.

Example III

Example 39 (Reference Example): Preparation of polymethylethoxysiloxane (Surface-treatment agent)

100 g of polymethylhydrogensiloxane (KF99, made by Shinetsu Chemical Industry) was dropwise added to 75 g ethanol and 100 μl of 1% isopropyl alcohol solution of chloroplatinic acid at 70° C. for one hour and a reaction was caused at 80° C. for 8 hours after the dropwise addition to obtain polymethyl ethoxysiloxane having the following structure;

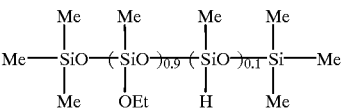

the yield was 90%.

Examples 40–45 (Present Invention) and Example 46 (Comparative)

Polysiloxane surface-treated metal oxide was obtained by bring into contact the metal oxide shown in Table VIII with 3% acetone solution of the polymethylethoxy siloxane obtained above, followed by drying at 80° C. Thus, the polysiloxane surface-treated metal oxide was obtained.

The hydrophobicity of the polysiloxane surface-treated metal oxide was determined as follows.

○ . . . Substantially all metal oxide floated on the water when introduced into water X . . . Substantially all metal oxide sinked in the water when introduced into water.

The results are shown in Table VIII. As is clear from the results shown in Table VIII, sufficient hydropholicity was observed in the case of Examples 40–45 and the dispersibility thereof in the starting rubber was good.

TABLE VIII

|  | Ex. 40[*1] | Ex. 41[*1] | Ex. 42[*1] | Ex. 43[*1] | Ex. 44[*1] | Ex. 45[*1] | Ex. 46[*2] |
|---|---|---|---|---|---|---|---|
| Silica 1) | 100 | — | — | — | — | 100 | 100 |
| Titanium oxide 2) | — | 100 | — | — | — | — | — |
| Clay 3) | — | — | 100 | — | — | — | — |
| Kaolin 3) | — | — | — | 100 | — | — | — |
| Bentonite 3) | — | — | — | — | 100 | — | — |
| Polysiloxane 4) | 5 | 8 | 5 | 5 | 5 | 3 | — |
| KF99 5) | — | — | — | — | — | — | 5 |
|  | ◯ | ◯ | ◯ | ◯ | ◯ | ◯ | X |

1) Nipsil AQ (Japan Silica)
2) R820 (Ishihara Sougyo)
3) Kanto Kagaku Shiyaku
4) Polysiloxane prepared in Example 39
5) Methylhydrogen polysiloxane
[*1]Present Invention
[*2]Comparative Examples 47–51 (Present Invention). Examples 52–53 (Standard) and Examples 54–55 (Comparative)

The components other than the sulfur and the vulcanization accelerator were kneaded in a 1.8 later closed type mixer for 3 to 5 minutes and when the temperature reached at 165±5° C., the masterbatch was discharged. The masterbatch was then kneaded with the valcanization accelerator and surfur by an 8-inch open rolls to obtain the rubber composition.

The unvulcanized physical properties of the obtained rubber composition were measured. Next, the composition was pressed and vulcanized in a 15×15×0.2 cm mold at 160° C. for 20 minutes to prepare the desired test piece and the vulcanized physical properties were evaluated.

The test methods for the unvulcanized physical properties and vulcanized physical properties of the compositions obtained in the Examples were as follows:
Unvulcanized Physical Properties
Scorch time: Time for viscosity to rise 5 points at 125° C. measured based on JIS K 6300.
Vulcanized Physical Properties
1) 300% modulus, tensile strength at break, and elongation at break: Measured in accordance with JIS K 6251 (dumbbell shape no. 3)

2) Abrasion resistance: Measured by Lambourn tester. Reduction in weight by abrasion indicated by index.
Abrasion resistance (index)=[(reduction in weight in Standard Example 47 or 53)/(reduction of weight at samples)]×100

Example 47 (Standard), Examples 48–51 (Present Invention) and Example 52 (Comparative)

These Examples show the results of evaluation of polysiloxane surface-treated silica and not including carbon black. The results are shown in Table IX.

The surface-treated silica-1, 2, 3 and 4 are those obtained by surface treating the surface of silica (Nipsil AQ manufactured by Japan Silica) 5, 10, 20 and 30 parts by weight of polymethylethoxy siloxane prepared in Reference Example 39, based upon 100 parts by weight of silica, respectively. The surface treatment was carried out by contacting the silica with 3% acetane solution of polymethylethoxy siloxane at room temperature followed by drying at 120° C.

Example 53 (Standard), Example 54 (Present Invention) and Example 55 (Comparative Example)

These Examples show the results of evaluation of polymethylethoxysiloxane in the system containing oil extended SBR and carbon black. The results are shown in Table IX.

TABLE IX

|  | Ex. 47[*1] | Ex. 48[*2] | Ex. 49[*2] | Ex. 50[*2] | Ex. 51[*2] | Ex. 52[*3] | Ex. 53[*1] | Ex. 54[*1] | Ex. 55[*3] |
|---|---|---|---|---|---|---|---|---|---|
| Formulation (parts by weight) | | | | | | | | | |
| Natural rubber (SMR5L) | 50.0 | 50.0 | 50.0 | 50.0 | 50.0 | 50.0 | — | — | — |
| SBR (1) | 50.0 | 50.0 | 50.0 | 50.0 | 50.0 | 50.0 | — | — | — |
| SBR (2) | — | — | — | — | — | — | 150.0 | 150.0 | 150.0 |
| Carbon black (SAF) | — | — | — | — | — | — | 70.0 | 70.0 | 70.0 |
| Silica (3) | 50.0 | — | — | — | — | 50.0 | 20.0 | — | 20.0 |
| Surface treated silica-1 | — | 52.50 | — | — | — | — | — | 21.0 | — |
| Surface treated silica-2 | — | — | 55.00 | — | — | — | — | — | — |
| Surface treated silica-3 | — | — | — | 60.00 | — | — | — | — | — |
| Surface treated silica-4 | — | — | — | — | 65 | — | — | — | — |
| Polyrnethylethoxy silane | — | — | — | — | — | 2.50 | — | — | 1.00 |
| Silane coupling agent (4) | 2.50 | 2.50 | 2.50 | 2.50 | 2.50 | 2.50 | 1.00 | 1.00 | 1.00 |
| Diethylene glycol | 2.50 | 2.50 | 2.50 | 2.50 | 2.50 | 2.50 | 1.00 | 1.00 | 1.00 |
| ZnO | 3.00 | 3.00 | 3.00 | 3.00 | 3.00 | 3.00 | 3.00 | 3.00 | 3.00 |
| Stearic acid | 1.00 | 1.00 | 1.00 | 1.00 | 1.00 | 1.00 | 2.00 | 2.00 | 2.00 |
| Antioxidant (6C) | 1.00 | 1.00 | 1.00 | 1.00 | 1.00 | 1.00 | 3.00 | 3.00 | 3.00 |
| Microcrystalline wax | — | — | — | — | — | — | 1.00 | 1.00 | 1.00 |
| Powdered sulfur (5% oil treatment) | 1.70 | 1.70 | 1.70 | 1.70 | 1.70 | 1.70 | 2.00 | 2.00 | 2.00 |
| Vulcanization accelerator (DPG) | 1.00 | 1.00 | 1.00 | 1.00 | 1.00 | 1.00 | — | — | — |
| Vulcanization accelerator (CZ) | 0.25 | 0.25 | 0.25 | 0.25 | 0.25 | 0.25 | 2.00 | 2.00 | 2.00 |

TABLE IX-continued

|  | Ex. 47[*1] | Ex. 48[*2] | Ex. 49[*2] | Ex. 50[*2] | Ex. 51[*2] | Ex. 52[*3] | Ex. 53[*1] | Ex. 54[*1] | Ex. 55[*3] |
|---|---|---|---|---|---|---|---|---|---|
| Scorching time (min.) | 7.8 | 14.4 | 12.3 | 12.0 | 9.9 | 13.0 | 24.9 | 30.3 | 28.2 |
| 300% Modulus | 8.9 | 10.2 | 12.9 | 12.1 | 9.8 | 9.9 | 11.0 | 11.8 | 11.5 |
| Tensile Strength at break (MPa) | 23.4 | 26.4 | 22.5 | 21.3 | 20.2 | 24.6 | 22.2 | 23.7 | 22.8 |
| Elongation at break (%) | 570 | 580 | 460 | 470 | 540 | 570 | 566 | 575 | 569 |
| Antiabrasin (index) | 100 | 130 | 152 | 122 | 109 | 126 | 100 | 115 | 112 |

(1) Nipol NS116 (Nippon Zeon)
(2) Nipol 9528 (Nippon Zeon, 33.33% oil extended)
(3) Nipsil AQ (Nippon Silica)
(4) Si69 (Degussa)
[*1]Standard
[*2]Present Invention
[*3]Comparative Examples 56–60 (Present Invention) and Example 61 (Standard)

The surface of silica (Nipsil AQ manufactured by Nippon Silica) was allowed to surface treat with polymethylethyoxy siloxane prepared in Reference Example 39 and titanium catalyst (Examples 56–60) in the compositions shown in Table X at 100° C. for 1 hour. The resultant mixture was extracted with acetone by Soxhlet's extractor and the conversion was determined from the weight thereof the results are shown in Table X.

TABLE X

|  | Ex. 56[*4] | Ex. 57[*4] | Ex. 58[*4] | Ex. 59[*4] | Ex. 60[*4] | (wt. part) Ex. 61[*3] |
|---|---|---|---|---|---|---|
| Silica | 100 | 100 | 100 | 100 | 100 | 100 |
| Polysiloxane 13 | 20 | 20 | 20 | 20 | 20 | 20 |
| Titanium catalyst 1[*1] | 0.2 | 0.2 | 1 | — | — | — |
| Titanium catalyst 2[*2] | — | — | — | 0.5 | 1 | — |
| Conversion (%) | 91 | 99 | 99 | 99 | 99 | 65 |

[*1]TA-10 (see the structure above)
[*2]TC-100 (see the structure above)
[*3]Standard
[*4]Present Invention As is clear from the results shown in Table X, Examples 56–60 using the titanium catalyst exhibit higher conversions when compared with Standard Example 61.

All the surface-treated silica obtained improved the processability of the unvulcanized rubber composition and the tensile stress and antiabrasion of the vulcanized product, when evaluated in the same manner as in Examples 47–50.

As explained above, according to the present invention, by mixing into the rubber composition a metal oxide surface-treated with a polysiloxane containing an alkoxysilyl group (I) or an acyloxysilyl group (II), it is possible to remarkably improve the processability (i.e., scorching time) of the unvulcanized rubber composition and 300% modulus and antiabrasion as shown by Examples 48 to 51. Furthermore, as shown in Example 55, when carbon black and surface-treated silica were formulated, the processability (i.e., scorching time) of the unvulcanized rubber composition can be improved. As shown in Examples 56–60, the surface treatment efficiency can be improved when a titanium catalyst is used.

Example IV

The various polysiloxanes 1 and 2 mentioned above were used the other ingredients used in the formulations of the following standard Examples, Examples of the Invention, and Comparative Examples were the following commercially available products:

Natural rubber: RSS#1
SBR (NS116): Nipol NS116 (Nihon Zeon)
SBR (NP9528): Nipol 9528 (Nihon Zeon)
SBR (NP1530): Nipol 1530 (Nihon Zeon)
BR (NP1220): Nipol BR1220L (Nihon Zeon)
Silica: Nipsil AQ (Nihon Silica)
Silane coupling agent: Si69 (Degussa) (chemical name: bis-[3-(triethoxylsilyl)-propyl]tetrasulfide)
Carbon black 1: Seast KH (Tokai Carbon)
Carbon black 2: Seast 9M (Tokai Carbon)
Powdered sulfur: 5% oil treated powdered sulfur
Antioxidant 6C: N-phenyl-N'-(1,3-dimethylbutyl)-p-phenylenediamine
Aromatic oil: Aromatic process oil
vulcanization accelerator CZ: N-cyclohexyl-2-benzothiazylsulfenamide
Vulcanization accelerator DPG: Diphenylguanidine
Zinc oxide: Zinc White no. 3
Stearic acid: Industrial use stearic acid Preparation of Samples The components other than the vulcanization accelerator and the sulfur were mixed in a 1.8 liter internal mixer for 3 to 5 minutes. The vulcanization accelerator and sulfur were kneaded by an 8-inch open roll to the master batch discharged when reaching 165±5° C. to obtain the rubber composition. In the case of 2-step mixing, the first step consists of mixing in a 1.8 liter internal mixer for 3 to 4 minutes. The master batch discharged when reaching 150±5° C. was mixed together with the remaining components in the second step by a 1.8 liter internal mixer for 3 to 5 minutes. The vulcanization accelerator and sulfur were mixed with the master batch of the second step discharged when reaching 165±5° C. by an 8 inch open roll to obtain the rubber composition. The unvulcanized physical properties of the obtained rubber composition were measured.

Next, the composition was pressed and vulcanized in a 15×15×0.2 cm mold at 160° C. for 20 minutes to prepare the desired test piece and the vulcanized physical properties were evaluated.

The test methods for the unvulcanized physical properties and vulcanized physical properties of the compositions obtained in the Examples were as follows:

Unvulcanized Physical Properties
The same as mentioned above.

Vulcanized Physical Properties
1) Carbon/silica dispersion state: Vulcanized rubber was cut by a sharp blade and the surface was observed and evaluated visually and by an optical microscope (×100, 400).

⊚ . . . Almost no poorly dispersed clumps of carbon and silica (several 100 μm diameter) and equal dispersion.

○ . . . Several poorly dispersed clumps of carbon and silica seen scattered, but otherwise dispersed to certain extent.

Δ . . . Several dozen poorly dispersed clumps of carbon and silica seen, but otherwise dispersed to certain extent.

X . . . Visible powder observable from cut surface. Innumerable poorly dispersed clumps of carbon and silica observed.

2) 300% modulus, tensile strength at break, and elongation at break: Measured in accordance with JIS K 6251 (dumbbell shape no. 3)

3) tanδ: Measured by viscoelasticity apparatus Rheograph Solid made by Toyo Seiki Seisakusho at 20 Hz, initial elongation of 10%, and dynamic strain of 2% (measured at sample width 5 mm and temperatures of 0° C. and 60° C.).

4) Abrasion resistance; Measured by Lambourn tester. Reduction in weight by abrasion indicated by index.

Abrasion resistance (index)=[(reduction in weight at reference test piece)/(reduction of weight at test pieces)]×100

However, the reference test pieces were calculated as Standard Examples 61, 67, and 74 in Tables XI to XIII.

Examples 61 to 62 (Standard Examples), Examples 63 to 64 (Examples of Invention). and Examples 65 to 66 (Comparative Examples)

These Examples show the results of evaluation of the silane coupling agent, polysiloxane, and single mixture in an NR, SBR system. The formulations and results are shown in Table XI.

TABLE XI

|  | Ex. 61[*1] | Ex. 62[*1] | Ex. 63[*2] | Ex. 64[*2] | Ex. 65[*3] | Ex. 66[*3] |
|---|---|---|---|---|---|---|
| (First step) |  |  |  |  |  |  |
| NR (RSS#1) | 50.0 | 50.0 | 50.0 | 50.0 | 50.0 | 50.0 |
| SBR (NS116) | 50.0 | 50.0 | 50.0 | 50.0 | 50.0 | 50.0 |
| Silica | 25.0 | 25.0 | 25.0 | 25.0 | 25.0 | 25.0 |
| Diethylene glycol | 2.5 | 2.5 | 2.5 | 2.5 | 2.5 | 2.5 |
| Silane coupling agent | 2.5 | 2.5 | 1.2 | 1.2 | 1.2 | 1.2 |
| Polysiloxane 1 | — | — | 1.3 | — | 1.3 | — |
| Polysiloxane 2 | — | — | — | 1.3 | — | 1.3 |
| Carbon black 1 | 25.0 | — | 25.0 | 25.0 | — | — |
| Zinc oxide | 3.0 | — | 3.0 | 3.0 | — | — |
| Stearic acid | 1.0 | — | 1.0 | 1.0 | — | — |
| Antioxidant 6C | 1.0 | — | 1.0 | 1.0 | — | — |
| Powdered sulfur | 2.1 | — | 2.1 | 2.1 | — | — |
| Vulcanization accelerator CZ | 1.0 | — | 1.0 | 1.0 | — | — |
| (Second step) |  |  |  |  |  |  |
| Carbon black 1 | — | 25.0 | — | — | 25.0 | 25.0 |
| Zinc oxide | — | 3.0 | — | — | 3.0 | 3.0 |
| Stearic acid | — | 1.0 | — | — | 1.0 | 1.0 |
| Antioxidant 6C | — | 1.0 | — | — | 1.0 | 1.0 |
| Powdered sulfur | — | 2.1 | — | — | 2.1 | 2.1 |
| Vulcanization accelerator CZ | — | 1.0 | — | — | 1.0 | 1.0 |
| Unvulcanized physical properties |  |  |  |  |  |  |
| Kneading performance in mixer | X | ○ | ⊚ | ○ | ⊚ | ⊚ |
| Mooney viscosity | 91.1 | 88.2 | 86.1 | 87.1 | 86.3 | 85.5 |
| Vulcanization rate (min.) | 16.1 | 15.6 | 13.1 | 13.3 | 12.9 | 13.0 |
| Scorching time (min.) | 17.7 | 16.8 | 18.7 | 19.1 | 19.1 | 19.0 |

TABLE XI-continued

|  | Ex. 61[*1] | Ex. 62[*1] | Ex. 63[*2] | Ex. 64[*2] | Ex. 65[*3] | Ex. 66[*3] |
|---|---|---|---|---|---|---|
| Vulcanized physical properties |  |  |  |  |  |  |
| Carbon/silica dispersion state | Δ | ◯ | ◉ | ◉ | ◯ | ◯ |
| 300% modulus (MPa) | 11.2 | 13.8 | 14.4 | 13.7 | 13.6 | 13.1 |
| Tensile Strength at break (MPa) | 22.7 | 24.3 | 25.1 | 24.0 | 23.5 | 24.5 |
| tanδ (0° C.) | 0.54 | 0.55 | 0.52 | 0.53 | 0.53 | 0.55 |
| tanδ (60° C.) | 0.24 | 0.20 | 0.22 | 0.21 | 0.22 | 0.23 |
| Abrasion resistance (index) | 100 | 105 | 121 | 117 | 111 | 109 |

(Notes:
[*1] indicates standard example,
[*2] example of invention, and
[*3] comparative example.)

Examples 67 to 69 (Standard Examples), Examples 70 to 72 (Examples of Invention), and Example 73 (Comparative Examples)

These Examples show the results of evaluation of the silane coupling agent, polysiloxane, and simultaneous Mixture in an SBR system. The formulations and results are shown in Table XII.

Examples 74 to 75 (Standard Examples), Examples 76 to 78 (Examples of Invention), and Examples 79 to 80 (Comparative Examples)

These Examples show the results of evaluation of the silane coupling agent, polysiloxane, and single mixture in an SBR system. The formulations and results are shown in Table XIII.

TABLE XII

|  | Ex. 67[*1] | Ex. 68[*1] | Ex. 69[*1] | Ex. 70[*2] | Ex. 71[*2] | Ex. 72[*2] | Ex. 73[*3] |
|---|---|---|---|---|---|---|---|
| (First step) |  |  |  |  |  |  |  |
| NR (RSS#1) | 60.0 | 60.0 | 60.0 | 60.0 | 60.0 | 60.0 | 60.0 |
| BR (NP1220) | 40.0 | 40.0 | 40.0 | 40.0 | 40.0 | 40.0 | 40.0 |
| Silica | 10.0 | 20.0 | 10.0 | 10.0 | 20.0 | 10.0 | 10.0 |
| Diethylene glycol | 0.5 | 1.5 | 0.5 | 0.5 | 1.5 | 0.5 | 0.5 |
| Silane coupling agent | 1.0 | 2.0 | 1.0 | 0.5 | 1.0 | 0.5 | 0.5 |
| Polysiloxane 1 | — | — | — | 0.5 | 1.0 | — | 0.5 |
| Polysiloxane 2 | — | — | — | — | — | 0.5 | — |
| Carbon black 2 | 50.0 | 40.0 | — | 50.0 | 40.0 | 50.0 | — |
| Zinc oxide | 5.0 | 5.0 | — | 5.0 | 5.0 | 5.0 | — |
| Stearic acid | 1.0 | 1.0 | — | 1.0 | 1.0 | 1.0 | — |
| Antioxidant 6C | 5.0 | 5.0 | — | 5.0 | 5.0 | 5.0 | — |
| Aromatic oil | 20.0 | 20.0 | — | 20.0 | 20.0 | 20.0 | — |
| Powdered sulfur | 1.0 | 1.0 | — | 1.0 | 1.0 | 1.0 | — |
| Vulcanization accelerator CZ | 1.0 | 1.0 | — | 1.0 | 1.0 | 1.0 | — |
| (Second step) |  |  |  |  |  |  |  |
| Carbon black 2 | — | — | 50.0 | — | — | — | 50.0 |
| Zinc oxide | — | — | 5.0 | — | — | — | 5.0 |
| Stearic acid | — | — | 1.0 | — | — | — | 1.0 |
| Antioxidant 6C | — | — | 5.0 | — | — | — | 5.0 |
| Aromatic oil | — | — | 20.0 | — | — | — | 20.0 |
| Powdered sulfur | — | — | 1.0 | — | — | — | 1.0 |
| Vulcanization accelerator CZ | — | — | 1.0 | — | — | — | 1.0 |
| Unvulcanized physical properties |  |  |  |  |  |  |  |
| Kneading performance in mixer | X | X | ◯ | ◯ | ◯ | ◯ | ◯ |
| Mooney viscosity | 83.2 | 82.5 | 80.1 | 80.9 | 78.2 | 80.5 | 80.2 |
| Vulcanization rate (min.) | 6.9 | 8.2 | 6.8 | 6.1 | 7.2 | 6.4 | 6.8 |
| Scorching time (min.) | 24.7 | 27.8 | 25.1 | 26.7 | 28.7 | 26.5 | 25.8 |
| Vulcanized physical properties |  |  |  |  |  |  |  |
| Carbon/silica dispersion state | Δ | Δ | Δ | ◯ | ◯ | Δ | Δ |
| 300% modulus (MPa) | 4.48 | 4.29 | 4.67 | 4.81 | 4.62 | 4.79 | 4.66 |
| Tensile Strength at break (MPa) | 17.2 | 16.0 | 17.8 | 18.13 | 17.2 | 17.9 | 17.6 |
| tanδ (0° C.) | 0.332 | 0.316 | 0.334 | 0.331 | 0.314 | 0.328 | 0.331 |
| tanδ (60° C.) | 0.274 | 0.263 | 0.271 | 0.274 | 0.264 | 0.271 | 0.273 |
| Abrasion resistance (index) | 100 | 95 | 103 | 107 | 106 | 107 | 104 |

(Notes:
[*1] indicates standard example,
[*2] example of invention, and
[*3] comparative example.)

TABLE XIII

|  | Ex. 74[*1] | Ex. 75[*1] | Ex. 76[*1] | Ex. 77[*2] | Ex. 78[*2] | Ex. 79[*2] | Ex. 80[*3] |
|---|---|---|---|---|---|---|---|
| (First step) | | | | | | | |
| SBR (NP9528) | 100.0 | 100.0 | 100.0 | 100.0 | 100.0 | 100.0 | 100.0 |
| SBR (NP1730) | 40.0 | 40.0 | 40.0 | 40.0 | 40.0 | 40.0 | 40.0 |
| Silica | 20.0 | 20.0 | 20.0 | 20.0 | 20.0 | 20.0 | 20.0 |
| Diethylene glycol | 1.5 | 1.5 | 1.5 | 1.5 | 1.5 | 1.5 | 1.5 |
| Silane coupling agent | 2.0 | 2.0 | 1.0 | 0.5 | 1.0 | 1.0 | 1.0 |
| Polysiloxane 1 | — | 1.0 | 1.5 | — | 1.0 | — | — |
| Polysiloxane 2 | — | — | — | — | 1.1 | — | 1.0 |
| Carbon black 2 | 70.0 | — | 70.0 | 70.0 | 70.0 | — | — |
| Zinc oxide | 3.0 | — | 3.0 | 3.0 | 3.0 | — | — |
| Stearic acid | 2.0 | — | 2.0 | 2.0 | 2.0 | — | — |
| Antioxidant 6C | 5.0 | — | 5.0 | 5.0 | 5.0 | — | — |
| Aromatic oil | 10.0 | — | 10.0 | 10.0 | 10.0 | — | — |
| Powdered sulfur | 2.0 | — | 2.0 | 2.0 | 2.0 | — | — |
| Vulcanization accelerator CZ | 2.0 | — | 2.0 | 2.0 | 2.0 | — | — |
| (Second step) | | | | | | | |
| Carbon black 2 | — | 70.0 | — | — | — | 70.0 | 70.0 |
| Zinc oxide | — | 3.0 | — | — | — | 3.0 | 3.0 |
| Stearic acid | — | 2.0 | — | — | — | 2.0 | 2.0 |
| Antioxidant 5C | — | 5.0 | — | — | — | 5.0 | 5.0 |
| Aromatic oil | — | 10.0 | — | — | — | 10.0 | 10.0 |
| Powdered sulfur | — | 2.0 | — | — | — | 2.0 | 2.0 |
| Vulcanization accelerator CZ | — | 2.0 | — | — | — | 2.0 | 2.0 |
| Unvulcanized physical properties | | | | | | | |
| Kneading performance in mixer | X | ○ | ○ | ⊚ | ○ | ○ | ○ |
| Mooney viscosity | 82.5 | 79.0 | 76.6 | 75.6 | 78.0 | 76.3 | 77.1 |
| Vulcanization rate (min.) | 16.3 | 16.5 | 14.6 | 13.3 | 14.2 | 14.4 | 14.9 |
| Scorching time (min.) | 24.5 | 24.9 | 27.6 | 27.2 | 27.6 | 27.2 | 27.5 |
| Vulcanized physical properties | | | | | | | |
| Carbon/silica dispersion state | Δ | ○ | ⊚ | ⊚ | ○ | ○ | ○ |
| 300% modulus (MPa) | 9.9 | 10.8 | 10.6 | 10.4 | 10.7 | 10.5 | 10.6 |
| Tensile Strength at break (MPa) | 21.8 | 22.0 | 22.1 | 22.3 | 21.9 | 22.3 | 22.1 |
| tanδ (0° C.) | 0.737 | 0.731 | 0.730 | 0.733 | 0.729 | 0.721 | 0.723 |
| tanδ (60° C.) | 0.366 | 0.350 | 0.356 | 0.360 | 0.358 | 0.365 | 0.362 |
| Abrasion resistance (index) | 100 | 102 | 11o | 115 | 109 | 103 | 104 |

(Notes:
[*1]indicates standard example,
[*2]example of invention, and
[*3]comparative example.)

As explained above, according to the fourth aspect of the present invention, by mixing into the rubber composition for a tire tread silica along with the silane coupling agent and a polysiloxane of the above-mentioned formula (III), the processability of the unvulcanized rubber composition is improved and further the physical properties of the vulcanized rubber are equivalent or become better as shown by Examples 63 to 66, Examples 70 to 73, and Examples 76 to 80; when the silane coupling agent and polysiloxane of formula (III) are added, even if the silica and carbon are mixed in a simultaneous step, the state of dispersion of the carbon/silica is improved and equivalent or better physical properties are exhibited compared with other mixtures as shown by Examples 63 to 64, Examples 70 to 77, and Examples 76 to 78; and the abrasion resistance is particularly improved, as clear compared with Comparative Examples 65 to 66, Comparative Example 73, and Comparative Examples 79 to 80.

Example V

The following Examples shows the results of evaluation of polysiloxane in systems including various fillers.

The ingredients used in these formulations of the above-mentioned Examples, except for the following, were used, as shown in Table XIV.

Clay 1: Soft clay manufactured by Nihon Talc K.K.

Clay 2: SILKALIGHT manufactured by Takehara Chemical K.K.

Calcium carbonate 1: Light weight calcium carbonate manufactured by Maruo Calcium K.K.

Calcium carbonate 2: Heavy weight calcium carbonate manufactured by Maruo Calcium K.K.

The evaluations were carried out in the same measured as mentioned above. The results are shown in Table XIV.

TABLE XIV

| | Ex. 81[*1] | 82[*2] | 83[*1] | 84[*2] | 85[*1] | 86[*2] | 87[*1] | 88[*2] | 89[*1] | 90[*2] | 91[*1] | 92[*2] | 93[*3] |
|---|---|---|---|---|---|---|---|---|---|---|---|---|---|
| Formulation (Part by weight) | | | | | | | | | | | | | |
| NR | — | — | — | — | — | — | — | — | 100 | 100 | 100 | 100 | 100 |
| SBR | 100 | 100 | 100 | 100 | 100 | 100 | 100 | 100 | 100 | 100 | — | — | — |
| Polysiloxane 3 | — | 10 | — | 10 | — | 10 | — | 10 | — | 10 | — | 3.5 | 7.1 |
| Carbon black | — | — | — | — | — | — | — | — | — | — | 60 | 60 | 60 |
| Clay 1 | 100 | 100 | — | — | — | — | — | — | — | — | — | — | — |
| Clay 2 | — | — | 100 | 100 | — | — | — | — | — | — | — | — | — |
| Calcium carbonate 1 | — | — | — | — | 100 | 100 | — | — | 100 | 100 | — | — | — |
| Calcium carbonate 2 | — | — | — | — | — | — | 100 | 100 | — | — | — | — | — |
| Zinc oxide | 3 | 3 | 3 | 3 | 3 | 3 | 3 | 3 | 3 | | | | |
| Antioxidant | 1 | 1 | 1 | 1 | 1 | 1 | 1 | 1 | 1 | 1 | 1 | 1 | 10 |
| Stearic acid | 1 | 1 | 1 | 1 | 1 | 1 | 1 | 1 | 1 | 1 | — | — | — |
| Powdered sulfur | 1.5 | 1.5 | 1.5 | 1.5 | 1.5 | 1.5 | 1.5 | 1.5 | 1.5 | 1.5 | 6 | 6 | 6 |
| Valcanization accelerator | 1.7 | 1.7 | 1.7 | 1.7 | 1.7 | 1.7 | 1.7 | 1.7 | 1.7 | 1.7 | 0.7 | 0.7 | 0.7 |
| Unvalcanized physical property | | | | | | | | | | | | | |
| Kneading performance in mixer | Δ | ○ | Δ | ○ | ○ | ○ | ○ | ○ | Δ | ○ | ⊙ | ⊙ | ⊙ |
| Mooney viscosity | 62.4 | 51.2 | 55.8 | 44.2 | 63 | 55.8 | 56.2 | 49.6 | 72.8 | 62 | 56.4 | 47.2 | 39.4 |
| Vulcanization rate (min.) | 12.4 | 12.32 | 14.93 | 14.53 | 11.46 | 11.41 | 9.79 | 9.63 | 3.25 | 3.2 | 15.29 | 15.37 | 15.24 |
| Scorching time (min.) | more than 50 | more than 50 | more than 50 | more than 50 | more than 50 | more than 50 | more than 50 | more than 50 | 16.4 | 17.8 | 30.2 | 31.9 | 33.2 |
| Vulcanized physical property | | | | | | | | | | | | | |
| 300% modulus (MPa) | 2.26 | 2.11 | 3.26 | 3.3 | 1.91 | 1.5 | 1.39 | 1.31 | 3.46 | 3.66 | 20.76 | 19.26 | 18.01 |
| Tensile Strength at break (MPa) | 4.1 | 4 | 11 | 11.2 | 5.9 | 5.8 | 2.8 | 2.9 | 15 | 16.2 | 21.7 | 20.9 | |
| Elongation at break (%) | 533 | 538 | 687 | 684 | 627 | 573 | 523 | 523 | 581 | 660 | 317 | 330 | 302 |

[*1]Standard Example
[*2]Present Invention

What is claimed is:

1. A rubber composition for a pneumatic tire tread comprising (i) 100 parts by weight of at least one rubber selected from the group consisting of natural rubber, polyisoprene rubber, styrene-butadiene copolymer rubber, polybutadiene rubber, acrylonitrile-butadiene copolymer rubber, butyl rubber, a diene rubber and ethylene-propylene copolymer rubber, (ii) from 2 to 80 parts by weight of carbon black, (iii) from 5 to 80 parts by weight of silica, (iv) a sulfur-containing silane coupling agent, and (v) a polysiloxane having a number average molecular weight of 200 to 100,000 and having a repeating unit of the formula (III): wherein $R^3$ represents independently a methyl group, an ethyl group, or a phenyl group, $R^4$ represents independently hydrogen or a substituted or unsubstituted alkyl group, $R^5$ represents an alkyl group, m is 0 or an integer of 1 or more, and n is an integer of 6 or more.

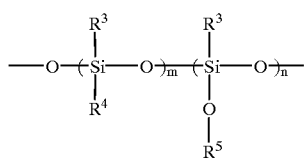

(III)

2. The rubber composition of claim 1, wherein the amounts of the polysiloxane and silane coupling agent are defined by:

(i) $0.5 \leq (W_{PS}/W_{SC}) \leq 7$; and
(ii) amount of silica×1 wt % $\leq W_{PS} + W_{SC} \leq$ amount of silica×40 wt % wherein $W_{PS}$ is the amount of the polysiloxane in parts by weight, and $W_{SC}$ is the amount of the silane coupling agent in parts by weight.

3. The rubber composition of claim 1, wherein the components (i)–(v) are simultaneously mixed together at a temperature of at least 120° C. to obtain the composition.

4. The rubber composition of claim 1, wherein the polysiloxane has the following formula (IV):

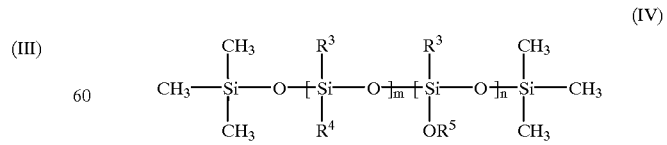

(IV)

wherein $R^3$ represents independently a methyl group, an ethyl group, or a phenyl group, $R^4$ represents independently hydrogen or a substituted or unsubstituted alkyl group, $R^5$ represents an alkyl group, m is 0 or an integer of 1 or more, and n is an integer of 6 or more and (iv) a sulfur-containing silane coupling agent.

5. The rubber composition of claim 1, wherein said sulfur-containing silane coupling agent is selected from the group consisting of:
   (a) bis-[3-(triethoxysilyl)-propyl]tetrasulfide,
   (b) 3-trimethoxysilylpropyl-N,N-dimethylthio-carbamoyltetrasulfide,
   (c) trimethoxysilylpropyl-mercaptobenzthiazoletetrasulfide,
   (d) thiethoxysilylpropyl-methacrylate monosulfide, and
   (e) dimethoxymethylsilylpropyl-N,N-dimethylthiocarbamoyltetrasulfide.

6. The rubber composition of claim 1, further comprising (vi) a vulcanization system composed of sulfur and a vulcanization accelerator.

7. A rubber composition comprising (i) at least one rubber selected from the group consisting of natural rubber, polyisoprene rubber, styrene-butadiene copolymer rubber, polybutadiene rubber, acrylonitrile-butadiene copolymer rubber, butyl rubber, a diene rubber and ethylene-propylene copolymer rubber, (ii) a filler, (iii) a polysiloxane (A) having one of the following structures and an average degree of polymerization of 3 to 10,000:

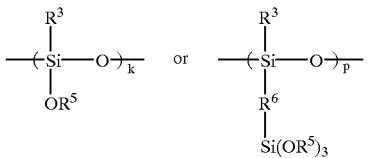

wherein, $R^3$ independently represents a methyl, ethyl or phenyl group, $R^5$ represents an alkyl, $R^6$ represents an alkylene group, k is at least 6 and p is at least 2 and (iv) a sulfur-containing silane coupling agent (B).

8. The rubber composition of claim 7 comprising (i) 100 parts by weight of said at least one rubber, (ii) from 5 to 100 parts by weight of silica, and (iii) an amount of a rubber compounding agent comprising the polysiloxane (A) and the sulfur-containing silane coupling agent (B) in a ratio of (A)/(B)=95/5 to 5/95 to give a content of the polysiloxane contained therein of 0.2 to 30% by weight based on the total composition.

9. The rubber composition of claim 7, wherein said filler is a silicon-containing filler.

10. The rubber composition of claim 7, wherein the polysiloxane is contained in an amount of 100% by weight or less based on the total amount of the filler.

11. The rubber composition of claim 7, wherein the sulfur-containing silane coupling agent is present in an amount of 40% by weight or less based on the total amount of the filler.

12. The rubber composition of claim 7, wherein said sulfur-containing silane coupling agent is selected from the group consisting of:
   (a) bis-[3-(triethoxysilyl)-propyl]tetrasulfide,
   (b) 3-trimethoxysillpropyl-N,N-dimethylthio-carbamoyltetrasulfide,
   (c) trimethoxysilylpropyl-mercaptobenzthiazoletetrasulfide,
   (d) thiethoxysilylpropyl-methacrylate monosulfide, and
   (e) dimethoxymethylsilylpropyl-N,N-dimethylthiocarbamoyltetrasulfide.

13. A rubber composition comprising (i) at least one rubber selected from the group consisting of a natural rubber, polyisoprene rubber, styrene-butadiene copolymer rubber, polybutadiene rubber, acrylonitrile-butadiene copolymer rubber, butyl rubber, a diene rubber and ethylene-propylene copolymer rubber, (ii) a filler, and (iii) a polysiloxane having the following formula (IV):

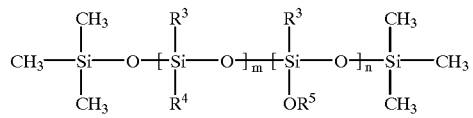

wherein $R^3$ represents independently a methyl group, an ethyl group, or a phenyl group, $R^4$ represents independently hydrogen or a substituted or unsubstituted alkyl group, $R^5$ represents an alkyl group, m is 0 or an integer of 1 or more, and n is an integer of 6 or more.

14. The rubber composition of claim 13, wherein said filler is a silicon-containing filler.

15. The rubber composition of claim 14, wherein the polysiloxane is contained in an amount of 100% by weight or less based on the total amount of the filler.

16. The rubber composition of claim 13, wherein the sulfur-containing silane coupling agent is contained in an amount of 40% by weight or less based on the total amount of the filler.

17. The rubber composition of claim 13, further comprising (v) a vulcanization system composed of sulfur and a vulcanization accelerator.

* * * * *

UNITED STATES PATENT AND TRADEMARK OFFICE
CERTIFICATE OF CORRECTION

PATENT NO.   : 6,177,505 B1
DATED        : January 23, 2001
INVENTOR(S)  : Fumito Yatsuyanagi et al.

It is certified that error appears in the above-identified patent and that said Letters Patent is hereby corrected as shown below:

<u>Column 42,</u>
Line 6, "trimethoxysillpropyl" should read -- trimethoxysilylpropyl --.
Line 25, to the right of structure, insert -- (IV) --.
Line 38, "claim 14" should read -- claim 13 --.

Signed and Sealed this

Fifth Day of August, 2003

JAMES E. ROGAN
*Director of the United States Patent and Trademark Office*